United States Patent
Kato et al.

(10) Patent No.: US 6,913,780 B2
(45) Date of Patent: Jul. 5, 2005

(54) MAGNETIC RECORDING MEDIUM, AND METHOD FOR PRODUCING AND INSPECTING THE SAME

(75) Inventors: Junya Kato, Chiba (JP); Mikio Suzuki, Nakakoma (JP)

(73) Assignee: Showa Denko K.K., Tokyo (JP)

(*) Notice: Subject to any disclaimer, the term of this patent is extended or adjusted under 35 U.S.C. 154(b) by 35 days.

(21) Appl. No.: 10/343,202

(22) PCT Filed: Jul. 31, 2001

(86) PCT No.: PCT/JP01/06580

§ 371 (c)(1),
(2), (4) Date: Jan. 29, 2003

(87) PCT Pub. No.: WO02/11130

PCT Pub. Date: Feb. 7, 2002

(65) Prior Publication Data

US 2003/0157374 A1 Aug. 21, 2003

Related U.S. Application Data

(60) Provisional application No. 60/246,595, filed on Nov. 8, 2000.

(30) Foreign Application Priority Data

Jul. 31, 2000 (JP) .................................. 2000-231114

(51) Int. Cl.[7] .............................. B32B 3/02; G11B 5/66; G01N 5/02; G01N 30/06
(52) U.S. Cl. .................... 427/8; 428/694 TC; 427/131; 73/74; 422/69
(58) Field of Search .......................... 427/8, 9, 10, 127, 427/130, 131; 428/65.3, 65.5, 65.4, 65.8, 692, 694 R, 694 TS, 694 TP, 694 TC, 694 TF, 694 TZ, 900; 73/1.02, 74, 1.04, 61.62; 436/176, 140, 5, 91, 145, 181, 139; 360/131, 136, 97.02, 132, 137; 422/80, 83, 68.1, 69, 78; 264/40.1

(56) References Cited

U.S. PATENT DOCUMENTS

| | | | | |
|---|---|---|---|---|
| 4,664,976 A | * | 5/1987 | Kimura et al. | ......... 428/694 TP |
| 4,737,415 A | * | 4/1988 | Ichijo et al. | ........... 428/694 TF |
| 5,162,235 A | * | 11/1992 | Hardy et al. | ................ 436/139 |

(Continued)

FOREIGN PATENT DOCUMENTS

| | | |
|---|---|---|
| DE | 35 19 383 A1 | 12/1985 |
| EP | 0 182 367 A2 | 5/1986 |
| EP | 0 194 675 A1 | 9/1986 |
| GB | 2 263 769 A | 8/1993 |
| JP | 63-222322 A | 9/1988 |
| JP | 10-269546 A | 10/1998 |
| JP | 2000-187833 A | 7/2000 |

*Primary Examiner*—Stevan A. Resan
*Assistant Examiner*—Louis Falasco
(74) *Attorney, Agent, or Firm*—Sughrue Mion, PLLC

(57) ABSTRACT

The present invention provides a method for inspecting deposition characteristics of a deposit on the surface of a protective film predominantly containing carbon of a magnetic recording medium, which medium includes a disk and the protective film formed on the disk, the disk including a non-magnetic substrate, a non-magnetic undercoat layer, and a magnetic layer, the layers being formed on the substrate, wherein the method includes comparing a predetermined threshold with the extraction amount of an inspection gas component and/or a compound component formed so as to contain the inspection gas component, the gas component and/or the compound component being extracted with an inspection solvent after the magnetic recording medium is allowed to stand in an atmosphere of the inspection gas component; a process for producing a magnetic recording medium in which the extraction amount is equal to or greater than the threshold, the extraction amount being obtained through the inspection method; and a magnetic recording medium produced through the production process.

14 Claims, 4 Drawing Sheets

U.S. PATENT DOCUMENTS

| | | | | |
|---|---|---|---|---|
| 5,229,899 | A | * 7/1993 | Brown et al. | 360/97.02 |
| 5,235,486 | A | * 8/1993 | Hibino et al. | 360/132 |
| 5,397,644 | A | * 3/1995 | Yamashita | 428/694 TC |
| 6,001,479 | A | * 12/1999 | Yokosawa et al. | 428/694 TC |
| 6,051,169 | A | * 4/2000 | Brown et al. | 364/40.1 |
| 6,316,062 | B1 | * 11/2001 | Sakaguchi et al. | 427/131 |
| 6,319,600 | B1 | * 11/2001 | Stirniman et al. | 428/694 TF |
| 6,340,505 | B1 | * 1/2002 | Suzuki et al. | 427/131 |
| 6,387,823 | B1 | * 5/2002 | Sonderman et al. | 427/8 |
| 6,395,073 | B1 | * 5/2002 | Dauber | 360/97.02 |
| 6,566,142 | B1 | * 5/2003 | Gateau et al. | 436/139 |

* cited by examiner

MAGNETIC RECORDING MEDIUM, AND METHOD FOR PRODUCING AND INSPECTING THE SAME

This application claims benefit of earlier applications based on Patent Application No. 2000-231114 filed in Japan (Filed: Jul. 31, 2000), and Provisional U.S. Patent Application No. 60/246595 (Filed: Nov. 8, 2000).

TECHNICAL FIELD

The present invention relates to a magnetic recording medium, a production process for the medium, and an inspection method for the medium; and more particularly to a magnetic recording medium exhibiting excellent durability, a production process for the medium, and an inspection method for the medium.

BACKGROUND ART

A hard disk apparatus, which is a type of magnetic recording and reproducing apparatus, includes a magnetic recording medium, and a magnetic head for recording data onto the medium and reproducing the data therefrom. Recently, recording density of the hard disk apparatus has been increased by 60% per year, and this trend is expected to continue in the future. Therefore, a magnetic recording head and a magnetic recording medium which are suitable for realization of high recording density have been developed.

A magnetic recording medium employed in a magnetic recording and reproducing apparatus or the like basically includes the structure as described below. On a substrate containing an Al alloy coated with Ni—P through plating or on a glass substrate, a non-magnetic undercoat layer for determining crystal orientation of a Co alloy layer is formed from Cr or a Cr alloy such as CrW or CrMo through sputtering among other methods. A thin film of Co alloy, serving as a magnetic layer, is formed on the non-magnetic undercoat layer. In addition, a protective film formed of an element such as carbon is provided on the magnetic layer, and if necessary, a lubricant such as perfluoropolyether is applied onto the protective film.

In recent years, requirement for high recording density of a magnetic recording medium has been increasing, and there has been demand for a magnetic recording medium which enables reduction in spacing loss (i.e., distance between a magnetic recording head and a magnetic layer). In order to reduce spacing loss, studies have been performed on thinning of a carbon protective film and reduction in the flying height of a magnetic recording head. In order to form a carbon protective film, sputtering or plasma CVD has been carried out.

A criterion for evaluating durability of a magnetic recording medium is fly stiction characteristic. The term "fly stiction characteristic" refers to a characteristic represented by a stiction value of a magnetic recording medium, which value is obtained when the medium is subjected to CSS (contact-start-stop) operation after the rotation of the medium and the flight of a magnetic head are maintained for a predetermined time. When the fly stiction characteristic of a magnetic recording medium is lowered, the flight stability of a magnetic head is lowered, which may result in problems such as head crush attributed to contact between a protective film and the magnetic head. Particularly, a medium of high recording density is used while the flying height of a magnetic head is maintained at a low level, and thus such a medium is demanded to exhibit excellent fly stiction characteristic.

However, a magnetic recording medium produced through the aforementioned conventional art may exhibit poor fly stiction characteristic. One of the reasons is thought to be as follows: when deposits are deposited onto the surface of such a magnetic recording medium in a magnetic recording and reproducing apparatus, and when the medium is employed for a prolonged period of time, the deposits are deposited onto a magnetic head, and thus fly stiction characteristic of the medium is lowered. One of such deposits is thought be a compound containing a gas component generated in the magnetic recording and reproducing apparatus or a compound which is formed through reaction between the gas component and an ionic substance contained in the apparatus, such as a metal. For example, a variety of members employed in the magnetic recording and reproducing apparatus are produced from plastic materials such as resin or photo-curing resins. A plasticizer such as a phthalate or a compound such as a photoreaction initiator is generated as an impurity gas component from such a material. Moreover, a lubricant employed in a pin of a connector part is present as an impurity gas component in the magnetic recording and reproducing apparatus. In order to maintain cleanliness of the magnetic recording and reproducing apparatus, the inside of the apparatus is segregated from the outside. Therefore, such a gas component generated inside the apparatus remains therein in a certain form, and a portion of the component is thought to become a deposit. When a magnetic head has the deposit on its surface, writing of data onto a magnetic recording medium or reading of the data therefrom may be unsatisfactory in practical use.

Therefore, there has been demand for a magnetic recording medium on which deposits are not easily deposited, the medium being employed in a magnetic recording and reproducing apparatus of high recording density. However, at the present time, there is no available method for inspecting the degree of difficulty in deposition of deposits onto a magnetic recording medium.

DISCLOSURE OF INVENTION

In view of the foregoing, an object of the present invention is to provide a method for inspecting the degree of difficulty in deposition of deposits onto a magnetic recording medium; a magnetic recording medium on which deposits are not easily deposited; a process for producing the medium; and a magnetic recording and reproducing apparatus comprising the medium.

The present inventors have performed extensive studies, and have found characteristics of a gas generated in a magnetic recording and reproducing apparatus, characteristics of a deposit on a carbon protective film of a magnetic recording medium, and characteristics of the carbon protective film. The present invention has been accomplished on the basis of this finding.

1) A first invention for solving the aforementioned problems provides a method for inspecting deposition characteristics of a deposit on the surface of a protective film predominantly containing carbon of a magnetic recording medium, which medium comprises a disk and the protective film formed on the disk, the disk comprising a non-magnetic substrate, a non-magnetic undercoat layer, and a magnetic layer, the layers being formed on the substrate, characterized in that the method comprises determining that the extraction amount of an inspection gas component and/or a compound component formed so as to contain the inspection gas component is equal to or greater than a predetermined threshold, the gas component and/or the compound component being extracted with an inspection solvent after the magnetic recording medium is allowed to stand in an atmosphere of the inspection gas component.

2) A second invention for solving the aforementioned problems is drawn to a specific embodiment of the inspection method according to 1), wherein the inspection gas component is a gas generated in a magnetic recording and reproducing apparatus comprising a magnetic recording medium and a magnetic head for recording data onto the medium and reproducing the data therefrom.

3) A third invention for solving the aforementioned problems is drawn to a specific embodiment of the inspection method according to 1) or 2), wherein the inspection gas component is one or more selected from among a siloxane-containing gas, an acrylic-acid-containing gas, vaporized melamine, a vaporized lubricant, a vaporized higher fatty acid, a vaporized phthalic acid ester, and vaporized dioctyl phthalate.

4) A fourth invention for solving the aforementioned problems is drawn to a specific embodiment of the inspection method according any one of 1) through 3), wherein the inspection gas component is a gas component generated from a member employed inside the magnetic recording and reproducing apparatus.

5) A fifth invention for solving the aforementioned problems is drawn to a specific embodiment of the inspection method according any one of 1) through 4), wherein the inspection solvent is one or more selected from among methanol, ethanol, isopropyl alcohol, and water.

6) A sixth invention for solving the aforementioned problems is drawn to a specific embodiment of the inspection method according any one of 1) through 5), wherein the threshold is 0.06 [$\mu$g/100 cm$^2$] when the extracted component is melamine.

7) A seventh invention for solving the aforementioned problems provides a magnetic recording medium comprising a non-magnetic substrate; a non-magnetic undercoat layer and a magnetic layer, the layers being formed on the substrate; and a protective film predominantly containing carbon, the film being formed on the magnetic layer, characterized in that the extraction amount of an inspection gas component and/or a compound component formed so as to contain the inspection gas component is equal to or greater than a predetermined threshold, the gas component and/or the compound component being extracted with an inspection solvent after the magnetic recording medium is allowed to stand in an atmosphere of the inspection gas component.

8) A eighth invention for solving the aforementioned problems is drawn to a specific embodiment of the magnetic recording medium according to 7), wherein the threshold is 0.06 [$\mu$g/100 cm$^2$] when the extracted component is melamine.

9) A ninth invention for solving the aforementioned problems is drawn to a specific embodiment of the magnetic recording medium according to 7) or 8), wherein a peak of the infrared spectrum of the surface of the protective film predominantly containing carbon, the peak corresponding to a carbon-hydrogen bond, has an intensity of 0.055 or less.

10) A tenth invention for solving the aforementioned problems is drawn to a specific embodiment of the magnetic recording medium according to any one of 7) through 9), wherein the ratio of nitrogen to carbon in the protective film predominantly containing carbon is 5–40 at %.

11) A eleventh invention for solving the aforementioned problems is drawn to a specific embodiment of the magnetic recording medium according to any one of 7) through 10), wherein Id/Ig of the surface of the protective film predominantly containing carbon is 3.5 or less.

12) A twelfth invention for solving the aforementioned problems provides a process for producing a magnetic recording medium, which process comprises forming a protective film predominantly containing carbon on a disk comprising a non-magnetic substrate, a non-magnetic undercoat layer, and a magnetic layer, the layers being formed on the substrate, characterized in that the protective film is formed such that the extraction amount of an inspection gas component and/or a compound component formed so as to contain the inspection gas component is equal to or greater than a predetermined threshold, the gas component and/or the compound component being extracted with an inspection solvent after the magnetic recording medium is allowed to stand in an atmosphere of the inspection gas component.

13) A thirteenth invention for solving the aforementioned problems is drawn to a specific embodiment of the production process for a magnetic recording medium according to 12), wherein a formation process for the protective film predominantly containing carbon comprises a sputtering process in which the protective film is formed while bias is applied to the disk.

14) A fourteenth invention for solving the aforementioned problems is drawn to a specific embodiment of the production process for a magnetic recording medium according to 12), wherein a formation process for the protective film predominantly containing carbon comprises a plasma CVD process in which a reaction gas containing hydrocarbon is employed as a raw material.

15) A fifteenth invention for solving the aforementioned problems is drawn to a specific embodiment of the production process for a magnetic recording medium according to 12), wherein a formation process for the protective film predominantly containing carbon comprises a formation step including a plasma CVD process in which a reaction gas containing hydrocarbon is employed as a raw material, and a formation step including a sputtering process in which the protective film is formed while bias is applied to the disk.

16) A sixteenth invention for solving the aforementioned problems provides a magnetic recording and reproducing apparatus comprising a magnetic recording medium and a magnetic head for recording data onto the medium and reproducing data therefrom, characterized in that the magnetic recording medium is a magnetic recording medium as recited in any one of 7) through 11).

As used herein, the term "atomic %" may be abbreviated as "at %." As used herein, "1 nm" refers to "10 Å."

BEST MODES FOR CARRYING OUT THE INVENTION

One embodiment of the inspection method of the present invention will be described.

The inspection method of the present invention is roughly described below.

The inspection method of the present invention includes a step in which a magnetic recording medium serving as a sample is allowed to stand in an atmosphere of an inspection gas component, to thereby expose the surface of the medium to the inspection gas component, the medium including a protective film predominantly containing carbon; a step in which the resultant magnetic recording medium is immersed in an inspection solvent, to thereby subject the medium to extraction; a step in which the extraction amount of the inspection gas component and/or a compound formed so as to contain the gas component in the inspection solvent is measured after completion of immersion; and a step for determining that the extraction amount is equal to or greater than a predetermined threshold.

Conventionally, a magnetic recording medium including a protective film having deposits on its surface is immersed in a solvent, and then the extraction amount of the deposits in the solvent is measured. When the extraction amount is small or when the amount is equal to or lower than a certain threshold, the magnetic recording medium is considered to have a small amount of deposits; i.e., the medium is considered to not be prone to the deposition of deposits on its surface. In contrast, according to the present invention, after the magnetic recording medium is exposed to an inspection gas component, the extraction amount of the inspection gas component and/or a compound component formed so as to contain the gas component in an inspection solvent, which components may be deposits, is large; for example, the extraction amount is equal to or greater than a certain threshold.

Figure 2:
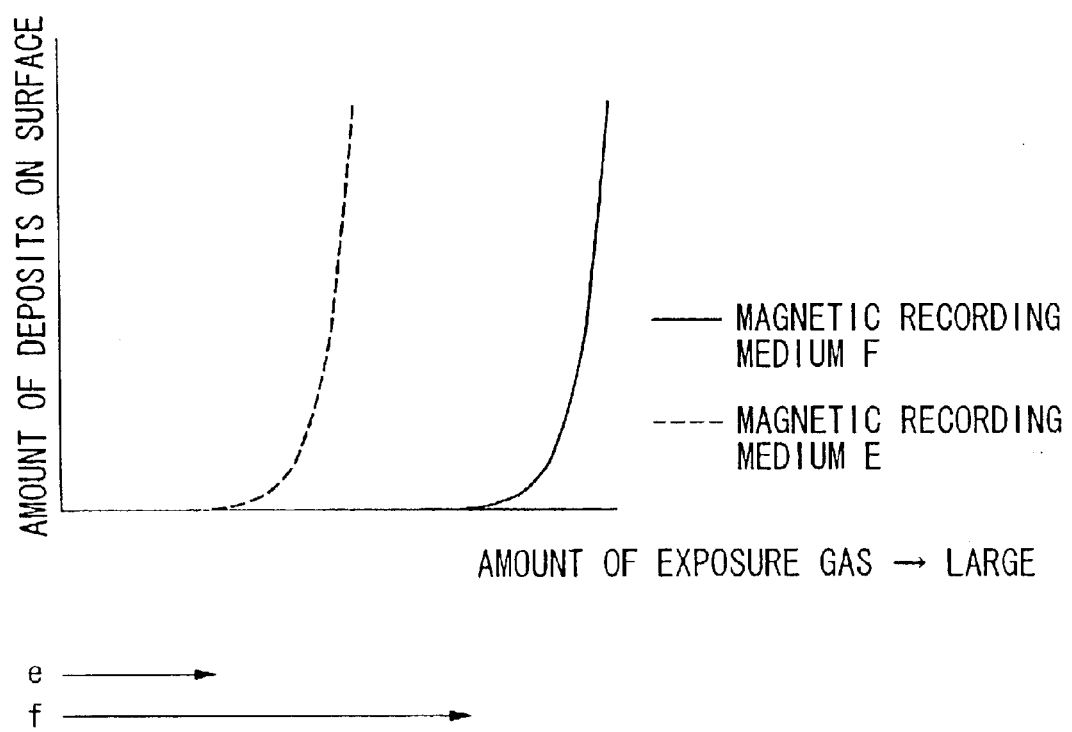
FIG. 2 shows the amount of deposits on the surface of a magnetic recording medium versus the total amount of diffusion gas.

In the present invention, the amount of deposits on the surface of a magnetic recording medium can be determined by the extraction amount of the deposits. The mechanism of the determination is assumed to be as follows. FIG. 2 shows the amount of deposits on the surface of a protective film of a magnetic recording medium when the amount of diffusion gas to which the medium is exposed varies; for example, due to variation of the exposure time. As shown in FIG. 2, in region e corresponding to magnetic recording medium E or in region f corresponding to magnetic recording medium F, even when the amount of diffusion gas increases, deposits are not deposited onto any medium. As is apparent from FIG. 2, the medium F is not prone to the deposition of deposits on its surface with respect to the amount of diffusion gas, as compared with the medium E. The present inventors have considered that, in the region e or f, diffusion gas is not deposited onto the surface of the protective film, but is adsorbed in the protective film. The present inventors have considered that, when the amount of diffusion gas exceeds the amount of the gas which can be adsorbed in the protective film, the protective film has deposits on its surface. Therefore, the amount of diffusion gas adsorbed in the protective film of the medium F is greater than that of diffusion gas adsorbed in the protective film of the medium E, and thus the protective film of the medium F is not prone to have deposits on its surface. The extraction amount of deposits as measured according to the present invention can be regarded as the amount of the deposits adsorbed in the protective film. The magnetic recording medium of the present invention in which the extraction amount of deposits is equal to or greater than a certain threshold is a magnetic recording medium which is not prone to have deposits on its surface, since the amount of the deposits adsorbed in the medium is satisfactorily large. For example, when the extraction amount of deposits on magnetic recording medium A (defective sample), which amount is measured according to the present invention, is regarded as a threshold, the extraction amount corresponding to the magnetic recording medium of the present invention is greater than the threshold. Briefly, the amount of deposits adsorbed in the medium of the invention is greater than that of deposits adsorbed in the medium A. Therefore, the magnetic recording medium of the present invention is not prone to have deposits on its surface.

A specific inspection procedure will next be described.

Figure 1:
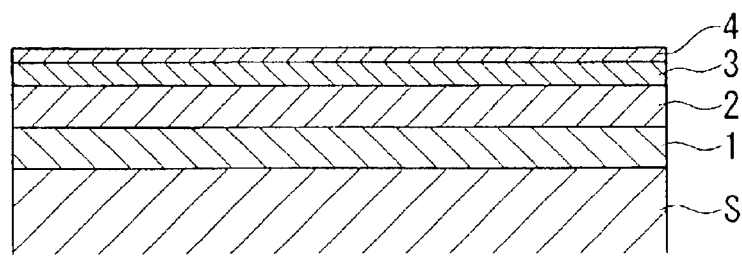
FIG. 1 is a cross-sectional view of one embodiment of the magnetic recording medium of the present invention.

FIG. 1 shows an exemplary magnetic recording medium employed as a sample for inspection. The magnetic recording medium includes a non-magnetic substrate S, a non-magnetic undercoat layer 1, a magnetic layer 2, a carbon protective film 3, and a lubrication layer 4, the layers and film being successively formed on the substrate S.

Firstly, the sample is allowed to stand in an atmosphere of an inspection gas, to thereby expose the surface of the sample to the gas. For example, the magnetic recording medium is allowed to stand in a sealed container capable of introduction and discharge of an inspection gas, and then the inspection gas is introduced into the container. When a magnetic recording and reproducing apparatus is employed as such a sealed container, the magnetic recording medium can be placed on a spindle in the apparatus, which is preferable. Moreover, when the spindle is rotated in a manner similar to the case of practical use of the apparatus, the magnetic recording medium is exposed to the inspection gas in a manner similar to the case of practical use of the medium, which is preferable. The rotation speed may be any value within a range of 4,200–15,000 [rpm].

The concentration of the inspection gas may be, for example, 3.8 [μg/the volume of the inner space of the magnetic recording and reproducing apparatus] (as reduced to siloxane oligomer). Alternatively, the concentration of the inspection gas may be, for example, 15 [ng/cm$^3$] (as reduced to siloxane oligomer). In order to accelerate the test, the concentration of the inspection gas is preferably high.

The time during which the magnetic recording medium is allowed to stand may be, for example, 24 hours. In order to adsorb the inspection gas sufficiently into the magnetic recording medium, the time is preferably sufficiently long.

The temperature when the magnetic recording medium is allowed to stand in the magnetic recording and reproducing apparatus may be, for example, ambient temperature. In order to accelerate the test, the temperature is preferably high.

The pressure when the magnetic recording medium is allowed to stand may be, for example, ambient pressure. In order to accelerate the test, the pressure is preferably high.

When the concentration of the inspection gas is low, the time during the magnetic recording medium is allowed to stand or the temperature when the magnetic recording medium is allowed to stand may be appropriately regulated (e.g., time: 72 hours, temperature: 40° C.), to thereby adsorb the inspection gas sufficiently into the magnetic recording medium.

The inspection gas may be a gas generated in the magnetic recording and reproducing apparatus, or may be a component forming a compound which constitutes a deposit on the surface of the magnetic recording medium. When such a gas or component is employed, the case in which the magnetic recording medium is practically used in the apparatus and the medium is exposed to the gas can be reproduced, which is preferable. The inspection gas is preferably one or more selected from among a siloxane-containing gas, an acrylic acid-containing gas, a stearic-acid-containing gas, vaporized melamine, a vaporized lubricant, a vaporized higher fatty acid (e.g., a fatty acid of C10 or more), a vaporized phthalic acid ester, and vaporized dioctyl phthalate. In the case in which such gas components are employed in combination, when the combination is similar to the combination of gas components in the apparatus when practically used, the inspection is carried out under the conditions similar to those under which the medium is practically used, which is preferable. Instead of introduction of such a gas, a member which generates gas, such as adhesive tape, resin, or film, may be allowed to stand together with the magnetic recording medium. For example, when the magnetic recording and reproducing apparatus is employed as a container, and a practically used member is allowed to stand therein together with the magnetic recording medium which is placed on the spindle, the inspection is carried out under the conditions similar to those under which the medium is practically used, which is preferable. When the spindle is rotated, the inspection is carried out under the conditions more similar to those under which the medium is practically used, which is preferable. In the case in which such a member is employed as a gas generation source, when the concentration of the gas is unknown, the time during the magnetic recording medium is allowed to stand or the temperature when the magnetic recording medium is allowed to stand may be appropriately regulated (e.g., time: 72 hours, temperature: 40° C.), to thereby adsorb the inspection gas sufficiently into the magnetic recording medium.

After completion of exposure, the resultant sample is immersed in an inspection solvent as described below, to thereby subject the sample to extraction. In this case, a target extraction component is the inspection gas component and/or a compound component formed so as to contain the gas component.

The inspection solvent may be any solvent, so long as the target extraction component is dissolved in the solvent. For example, the solvent is preferably one or more selected from among methanol, ethanol, isopropyl alcohol, and water.

The amount of the solvent may be, for example, 30 [ml/magnetic recording medium]. In order to enhance extraction efficiency, the amount is preferably large.

The extraction time may be, for example, one hour. When extraction ability of the solvent is low, the sample is preferably allowed to stand in the solvent for a prolonged period of time.

The temperature during extraction may be appropriately determined in accordance with the type of the inspection solvent, and may be determined at, for example, 80° C. In order to enhance extraction efficiency, the temperature is preferably high.

Subsequently, the target extraction component in the inspection solvent is quantitatively measured, for example, through a customary quantitative method by means of GC-MS.

The threshold is determined, for example, as described below. The threshold may be determined on the basis of the extraction amount as measured through the aforementioned method in the case in which, as a sample, there is employed a magnetic recording medium exhibiting durability which is required in practical use in a magnetic recording and reproducing apparatus. Alternatively, the threshold may be determined on the basis of the extraction amount as measured through the aforementioned method in the case in which a magnetic recording medium exhibiting poor durability is employed as a sample. For example, the threshold may be determined on the basis of the extraction amount as measured through the aforementioned method in the case in which a magnetic recording medium exhibiting poor fly stiction characteristic is employed as a sample or in the case in which a magnetic recording medium having deposits on its surface is employed as a sample, the deposits being observed after exposure to an inspection gas. The threshold may be obtained by multiplying the measured extraction amount by a safety factor. For example, when the extraction amount corresponding to a defective magnetic recording medium is X, the threshold may be determined to be X. Alternatively, by using $\alpha$ as a safety factor, the threshold may be determined to be (X×$\alpha$).

The inspection of a magnetic recording medium serving as a sample is carried out by comparing the extraction amount of the sample as measured through the aforementioned method with the threshold as determined through the aforementioned method, and by determining that the extraction amount is equal to or greater than the threshold.

According to a conventional inspection method, when the extraction amount is large or when the amount is equal to or greater than the threshold, the magnetic recording medium is determined to be defective. Therefore, a magnetic recording medium having a large amount of deposits not on its surface but inside thereof may be determined to be defective. In contrast, according to the inspection method of the present invention, a magnetic recording medium having a large amount of deposits inside thereof can be appropriately determined, since the extraction amount is equal to or greater than the threshold after exposure of the medium to an inspection gas. Consequently, the degree of difficulty in deposition of deposits onto the magnetic recording medium can be appropriately determined.

One embodiment of the magnetic recording medium of the present invention will be described.

FIG. 1 shows an example of the magnetic recording medium of the present invention. The magnetic recording medium includes a non-magnetic substrate S, a non-magnetic undercoat layer 1, a magnetic layer 2, a protective film 3 predominantly containing carbon, the layers and the film being formed on the substrate S, and a lubrication film 4 formed on the film 3.

The non-magnetic substrate S may be an aluminum alloy substrate on which an NiP plating film is formed (hereinafter the substrate may be referred to as "NiP-plated Al substrate"), which is generally employed as a substrate for magnetic recording media; or a substrate of glass, ceramic, or flexible resin, which substrate may be coated with NiP or another alloy through plating or sputtering.

The mean surface roughness (Ra) of the non-magnetic substrate S is preferably 1–20 Å, more preferably 1–15 Å.

The non-magnetic undercoat layer 1 may be a conventionally known non-magnetic undercoat layer. For example, the layer 1 may be a single element film formed from any element selected from Cr, Ti, Ni, Si, Ta, and W.

Alternatively, the layer 1 may be a film formed from an alloy containing any of the above elements as a primary component and other elements, so long as such "other elements" do not impede the crystallinity of the layer 1. The non-magnetic undercoat layer 1 is provided for controlling the crystal orientation of the magnetic layer 2 formed from a Co alloy. The layer 1 is particularly preferably formed from a material of Cr single element or a material containing Cr and one or more selected from among Mo, W, V, Ti, Nb, and Si. When the aforementioned material is employed, the composition is preferably CrzY (wherein Y is one or more selected from among Mo, W, V, Ti, Nb, and Si). The Y content (z) is preferably 20 at % or less, more preferably 10 at % or less. When the Y content is 20 at % or less, the orientation of the magnetic layer 2 formed from a Co alloy, the layer 2 being provided on the non-magnetic undercoat layer 1, is improved, and therefore the magnetic recording medium exhibits excellent coercive force and noise characteristics; i.e., the medium is suitable for realization of high recording density. As used herein, the term "primary component" in an alloy refers to the case in which the content of the component is in excess of 50 at %.

The crystal grain size of the non-magnetic undercoat layer 1 may affect the crystal grain size of the magnetic layer 2 formed from a Co alloy. The crystal grain size of the non-magnetic undercoat layer 1 may be reduced by adding an element such as B, Zr, or Ta to the material of the layer 1; i.e., Cr or a Cr alloy.

The thickness of the non-magnetic undercoat layer 1 is not particularly limited, so long as the thickness falls within a range so as to attain a appropriate coercive force. The thickness is preferably 100–1,000 Å, more preferably 150–700 Å. The magnetic recording medium including the non-magnetic undercoat layer 1 having a thickness falling within the above range exhibits enhanced coercive force and improved SNR; i.e., the medium is suitable for realization of high recording density.

The non-magnetic undercoat layer 1 may be of a single-layer structure, or of a multi-layer structure. When the layer 1 has a multi-layer structure, the layer 1 may be formed of a plurality of layers formed from the same composition or different compositions from among the aforementioned compositions. For example, the layer 1 may be a multi-layer structure in which a CrMo alloy layer (Mo content: 10 at % or less) is laminated on a Cr layer.

The magnetic layer 2 formed from a Co alloy may contain any Co alloy composition selected from among Co/Cr, Co/Cr/Ta, Co/Cr/Pt, Co/Cr/Pt/Ta, and the like.

The coercive force of the magnetic recording medium of the present invention is preferably 3,000 [oersteds] or more, preferably 3,500 [oersteds] or more.

The thickness of the magnetic layer 2 formed from a Co alloy falls within a range of 30–100 [G$\mu$m], which is a parameter of conventionally used Brd (the product of residual magnetization and film thickness [G$\mu$m]), and the thickness of the layer 2 may be a thickness so as to attain an appropriate recording and reproducing signal output.

In order to improve the orientation of the Co alloy and to obtain high coercive force, a non-magnetic intermediate layer may be provided between the non-magnetic undercoat layer 1 and the magnetic layer 2. For example, a CoCr alloy layer (Cr content: 50 at % or less) having a thickness of 25 Å or less may be formed.

The carbon protective film 3 is formed from a material predominantly containing carbon. The carbon protective film 3 is formed such that the extraction amount of an inspection gas component and/or a compound component formed so as to contain the inspection gas component is equal to or greater than a certain threshold, the gas component and/or the compound component being extracted with an inspection solvent after the magnetic recording medium is allowed to stand in an atmosphere of the inspection gas component. The extracted component is preferably melamine. When the extracted component is melamine, the threshold is 0.06 [$\mu$g/100 cm$^2$], preferably 0.12 [$\mu$g/100 cm$^2$], more preferably 0.24 [$\mu$g/100 cm$^2$]. Since melamine is a main impurity gas component which causes deposition in a magnetic recording and reproducing apparatus, the extraction component is determined to be melamine. The reason why the extraction amount of melamine is determined to the above range is described below. When the extraction amount falls within the above range, the amount of impurity gas adsorbed in the carbon protective film 3 increases, and thus deposits are not easily deposited onto the carbon protective film 3 of the magnetic recording medium. The extraction amount can be obtained through the aforementioned method.

The protective film 3 may contain nitrogen serving as another component. In this case, the ratio of nitrogen to carbon as measured by means of ESCA is preferably 5–40%, more preferably 5–25%, much more preferably 13–25%. This is because the film containing nitrogen is dense and hard.

When the carbon protective film 3 contains nitrogen, the film preferably contains nitrogen in an amount of 2 at % or less in the vicinity of a surface of the film 3, the surface being brought into contact with the magnetic layer. This is because, when the amount of nitrogen falls outside the above range, magnetostatic characteristics of the magnetic layer deteriorate and coercive force is lowered, and thus the magnetic recording medium is not suitable for realization of low flying height. The amount of nitrogen in the magnetic layer can be obtained by means of, for example, SIMS analysis. As used herein, the term "the vicinity" may refer to a position on the boundary between the magnetic layer and the protective film, at which the Co content is 5% of that of the magnetic layer.

A dense and hard protective film is preferable, since the film can suppress generation of wear powder, which would induce deposition of deposits and generation of Ni corrosion. As used herein, the term "Ni corrosion" refers to a phenomenon in which Ni contained in the Ni—P plating layer on the substrate arises on the surface of the magnetic recording medium through diffusion or the like. Ni corrosion is evaluated, for example, by measuring the amount of Ni after extraction of Ni on the surface of the medium.

When the carbon protective film 3 is subjected to FTIR, the intensity of the peak corresponding to a carbon-hydrogen bond is preferably 0.055 or less, more preferably 0.05 or less, much more preferably 0.04 or less. When the intensity falls within the above range, the protective film predominantly containing carbon has a strong bonding force to a lubricant on the film. When the bonding force is strong, the surface of the protective film is consistently coated with the lubricant, and thus deposition of deposits can be suppressed.

Measurement of the intensity of the peak corresponding to a carbon-hydrogen bond by means of FTIR is carried out, for example, through the following procedure. There is prepared an FTIR apparatus exhibiting a sensitivity such that, when a perfluoropolyether-containing lubricant is applied onto a disk so as to have a thickness of 2 nm, the measured intensity of the peak (e.g., the peak which arises within a region of 1,120–1,350 $cm^{-1}$) corresponding to a C—F bond (carbon-fluorine bond) of the infrared spectrum of the disk is 0.008. Firstly, the infrared spectrum of the protective film predominantly containing carbon (hereinafter the spectrum may be referred to as "the carbon protective film infrared spectrum") is obtained from the measured-infrared spectrum of the surface of the magnetic recording medium before formation of the protective film and the measured infrared spectrum of the surface of the magnetic recording medium after formation of the protective film. Subsequently, the area of the peak within a range of 2,800–3,100 $cm^{-1}$ of the infrared spectrum is calculated, and the calculated area is regarded as the intensity of the peak corresponding to a carbon-hydrogen bond. As used herein, the peak intensity refers to the absorption amount.

When the protective film 3 is subjected to Raman spectroscopy, the Id/Ig value is preferably 3.5 or less, more preferably 3.0 or less, much more preferably 2.5 or less. This is because, when the Id/Ig value falls within the above range, the protective film predominantly containing carbon is dense and hard. The Id/Ig value is obtained as follows: the measured Raman spectrum is separated into two bands; i.e., a G band having the peak in the vicinity of 1,500 $cm^{-1}$ and a D band having the peak in the vicinity of 1,400 $cm^{-1}$; and the ratio of Id (the integral value of intensity of the D band) to Ig (the integral value of intensity of the G band) is obtained.

The water contact angle of the surface of the protective film is preferably 80° or less, more preferably 75° or less. This is because, when the water contact angle is 80° or less, the protective film is satisfactorily bonded to the lubricant, and thus the lubricant is not easily deposited onto a magnetic head.

The thickness of the carbon protective film 3 may be 90 Å or less. The thickness is preferably 75 Å or less, more preferably 50 Å or less. This is because, when the thickness falls within the above range, spacing loss can be further reduced, and thus reproduction signal output can be increased.

The lubrication film 4 is formed through application of a lubricant. The lubricant may contain any lubricant selected from among a Fomblin-type lubricant (product of Ausimont), a Galden-type lubricant (product of Ausimont), a Demnum-type lubricant (product of Daikin Industries, Ltd.), and a Krytox-type lubricant (product of Du Pont).

In order to obtain the aforementioned effect, a Fomblin-type lubricant is preferably employed. This is because such a Fomblin-type lubricant has polar functional groups at both ends of its molecular chain, and the groups are easily adsorbed onto active sites of the carbon protective film 3.

The thickness of the lubricant film may be 5–30 Å, and is preferably 10–25 Å. When the thickness falls within this range, the magnetic recording medium exhibits appropriate lubricity, and the lubricant is not excessively deposited onto a magnetic head, which is preferable.

The extraction amount of an inspection gas component and/or a compound component formed so as to contain the inspection gas component is equal to or greater than a certain threshold, the gas component and/or the compound component being extracted with an inspection solvent after the magnetic recording medium of the present invention is allowed to stand in an atmosphere of the inspection gas component. Therefore, the protective film predominantly containing carbon of the magnetic recording medium is not prone to have deposits on its surface. When the extracted component is melamine, the threshold is preferably 0.06 [$\mu g/100\ cm^2$], more preferably 0.12 [$\mu g/100\ cm^2$], much more preferably 0.24 [$\mu g/100\ cm^2$]. Consequently, when the magnetic recording medium of the present invention is used while the flying height of a magnetic head is reduced, deposits are not easily deposited onto the head. Therefore, even when the magnetic recording medium is used while the flying height of a magnetic head is reduced, the fly stiction characteristic of the medium is not lowered. When the carbon protective film 3 is subjected to FTIR, the intensity of the peak corresponding to a carbon-hydrogen bond is preferably 0.055 or less. Therefore, the surface of the protective film is consistently coated with the lubricant, and thus deposition of deposits can be suppressed.

Preferably, the protective film 3 contains nitrogen, and the ratio of nitrogen to carbon as measured by means of ESCA is preferably 5–40%. Therefore, the film is dense and hard. Preferably, the magnetic recording medium of the present invention includes the protective film predominantly containing carbon, which film is hard and thin, exhibits excellent sliding durability and lubricity, and suppresses generation of wear powder inducing deposition of deposits and generation of Ni corrosion.

By reducing the flying height of a magnetic head and thinning the protective film predominantly containing carbon, the distance between the head and the magnetic layer serving as a magnetic recording layer is reduced. Therefore, in the magnetic recording medium of the present invention, spacing loss can be reduced. Consequently, since reproduction signal output can be increased and SNR (signal to noise ratio) is improved, the magnetic recording medium of the present invention is more applicable to high recording density, as compared with a conventional magnetic recording medium.

In addition, the coercive force is 3,000 [oersteds] or more, preferably 3,500 [oersteds] or more, and the mean surface roughness (Ra) is preferably 20 Å or less, more preferably 10 Å or less. This is because, when the coercive force is 3,000 [oersteds] or more, reproduction signal output can be further increased at high recording density, and when the mean surface roughness (Ra) is preferably 20 Å or less, the flying height of a magnetic head can be further reduced. Consequently, the magnetic recording medium of the present invention is more applicable to high recording density,.

Figure 3:
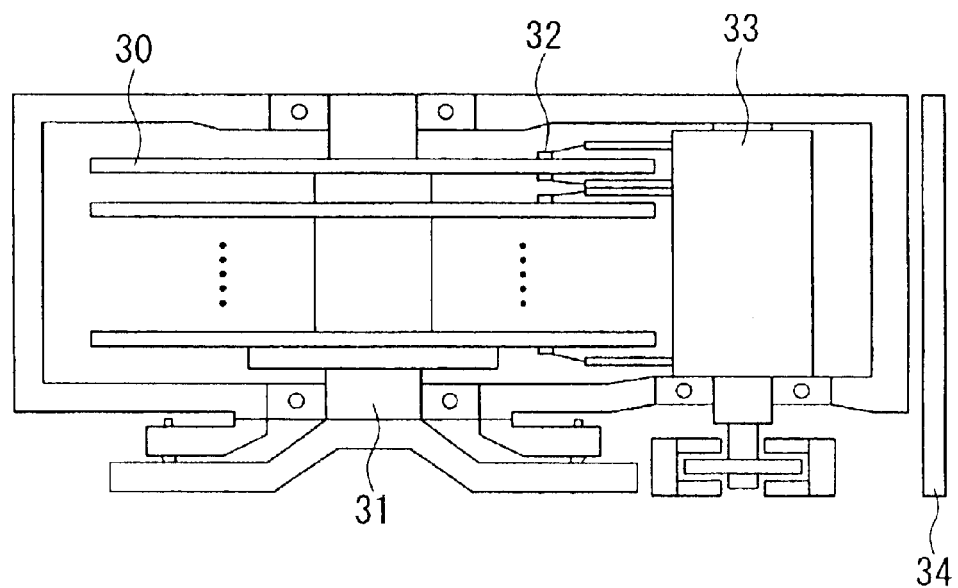
FIG. 3 is a schematic representation showing a magnetic recording and reproducing apparatus including the magnetic recording medium shown in FIG. 1.

FIG. 3 shows an exemplary magnetic recording and reproducing apparatus including the aforementioned magnetic recording medium. The magnetic recording and reproducing apparatus includes a magnetic recording medium 30 having the structure shown in FIG. 1; a medium driving portion 31 for rotating the magnetic recording medium 30; a magnetic head 32 for recording data onto the magnetic recording medium 30 and reproducing the data therefrom; a head driving portion 33 for moving the magnetic head 32 relatively to the magnetic recording medium 30; and a recorded/reproduced signal-processing system 34. In the system 34, a recorded external signal is processed and sent to the magnetic head 32, or a reproduction signal from the head 32 is processed and sent to the outside. A magnetic head including reproduction elements such as an MR (magnetoresistance) element utilizing anisotropic magnetoresistance (AMR) effect and a GMR element utilizing giant magnetoresistance (GMR) effect, which head is more suitable for realization of high recording density, may be employed as the magnetic head 32 of the magnetic recording and reproducing apparatus of the present invention.

The magnetic recording and reproducing apparatus includes the magnetic recording medium of the present invention (the extraction amount of an inspection gas component and/or a compound component formed so as to contain the inspection gas component is equal to or greater than a certain threshold, the gas component and/or the compound component being extracted with an inspection solvent after the magnetic recording medium is allowed to stand in an atmosphere of the inspection gas component). Since deposits are not easily deposited onto the surface of the magnetic recording medium, the magnetic head is not prone to having deposits on its surface even when the flying height of the head is reduced. Therefore, the flying height of the magnetic head of the apparatus can be further reduced, and thus the magnetic recording and reproducing apparatus of the present invention is applicable to higher recording density. The magnetic recording and reproducing apparatus exhibits excellent fly stiction characteristic.

The production process for the magnetic recording medium of the present invention will next be described.
(Apparatus Employed for the Production Process)

The CVD apparatus and the protective film modification apparatus employed in the present invention will be described.

Figure 4:
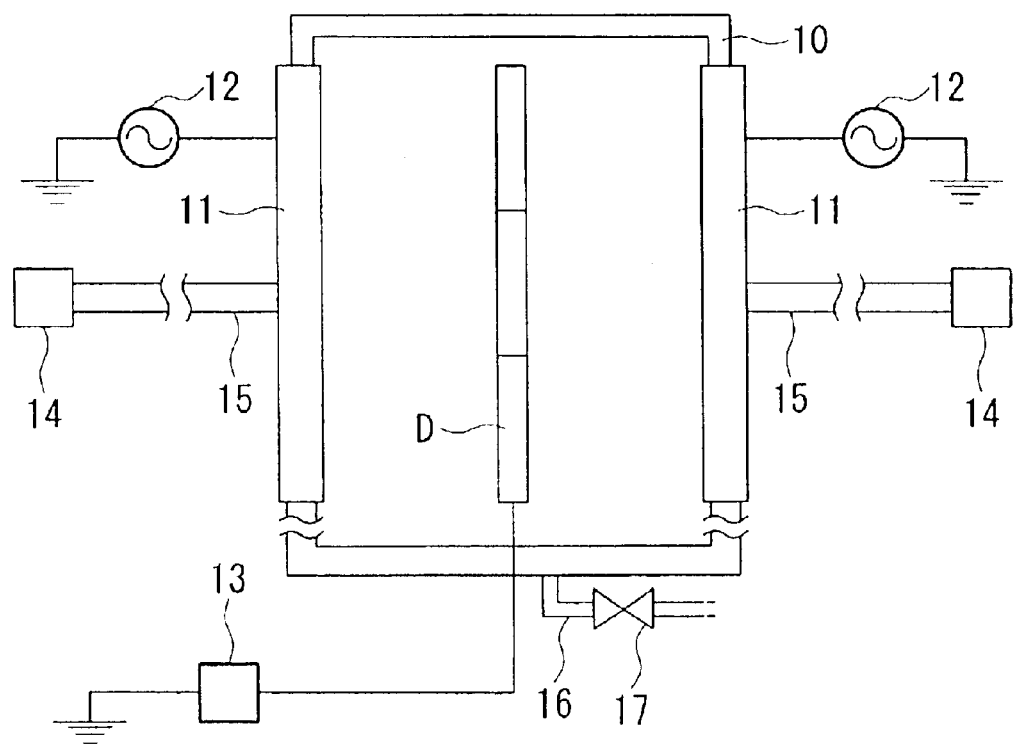
FIG. 4 is a schematic representation showing a plasma CVD apparatus employed for carrying out one embodiment of the production process for a magnetic recording medium of the present invention.

FIG. 4 shows a schematic representation of a plasma CVD apparatus serving as a main portion of the production apparatus employed for carrying out an embodiment of the production process for the magnetic recording medium of the present invention. The plasma CVD apparatus includes a CVD apparatus chamber 10 for accommodating a disk D on which a protective film predominantly containing carbon is formed; electrodes 11, 11 provided on opposing walls in the CVD apparatus chamber 10 so as to face each other; high-frequency power sources 12, 12 for supplying high-frequency power to the electrodes 11, 11; a bias power source 13 which may be connected to the disk D in the CVD apparatus chamber 10 when the protective film is formed on the disk D; and process gas supply sources 14, 14 for supplying process gas serving as a raw material for the protective film, which film is formed on the disk D.

The CVD apparatus chamber 10 is connected to feeding pipes 15, 15 for feeding process gas from the supply sources 14, 14 into the CVD apparatus chamber 10, and is also connected to a discharge pipe 16 for discharging gas from the CVD apparatus chamber 10 to the outside. The respective feeding pipes 15, 15 have process gas flow control valves (not shown in the figure), which control the flow rate of the gas fed to the CVD apparatus chamber 10 to thereby arbitrarily set the flow rate of the gas. The discharge pipe 16 has a discharge amount control valve 17, which controls the discharge amount to thereby arbitrarily set the pressure in the CVD apparatus chamber 10.

Preferred examples of the high-frequency power sources 12, 12 include a power source which can supply power of 50–1,000 W during formation of the protective film predominantly containing carbon and during discharge of oxygen plasma. The frequency of the high-frequency power sources 12, 12 is not particularly specified from the viewpoint of the effect of the present invention. For example, the frequency may be 13.56 MHz.

A pulse direct-current power source or a high-frequency power source may be employed as the bias power source 13.

Figure 5:
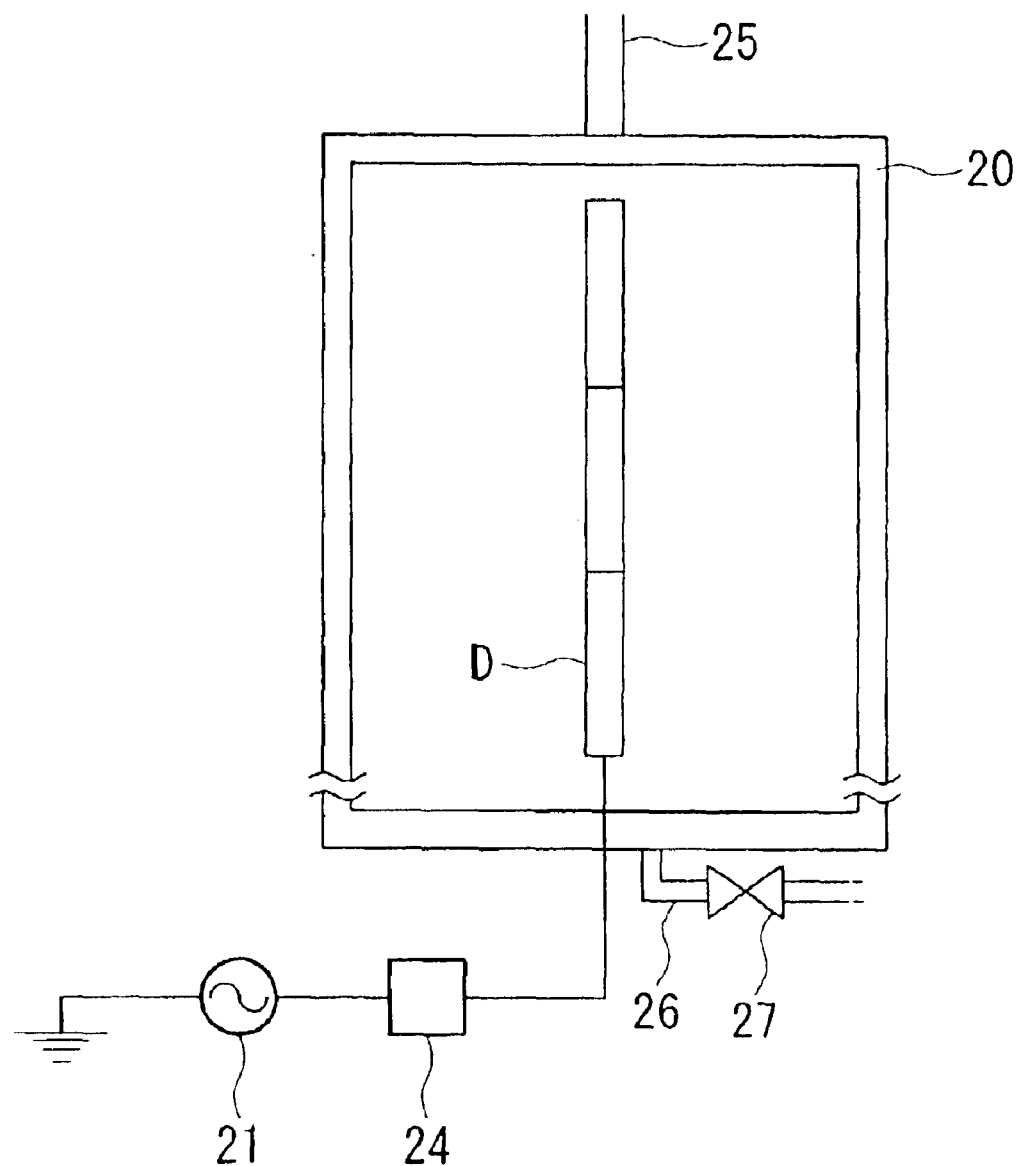
FIG. 5 is a schematic representation showing a protective film modification apparatus employed for carrying out one embodiment of the production process for a magnetic recording medium of the present invention.

FIG. 5 shows a schematic representation of a protective film modification apparatus employed for carrying out an embodiment of the production process for the magnetic recording medium of the present invention. The apparatus includes a chamber 20 for accommodating a disk D having a protective film predominantly containing carbon, which film is to be modified; and a high-frequency power source 21 for supplying high-frequency power to the disk D in the chamber 20. Reference numeral 24 represents a matching apparatus.

The chamber 20 is connected to a feeding pipe 25 for feeding nitrogen gas from a non-illustrated supply source into the chamber 20, and is also connected to a discharge pipe 26 for discharging gas from the chamber 20 to the outside. The discharge pipe 26 has a discharge amount control valve 27, which controls the discharge amount to thereby arbitrarily set the pressure in the chamber 20.

Preferred examples of the high-frequency power source 21 include a power source which can supply power of 50–1,000 W during modification of the protective film. The frequency of the high-frequency power source 21 is not particularly specified from the viewpoint of the effect of the present invention. The frequency may be an Rf frequency, of, for example, 13.56 MHz.

The protective film modification apparatus and the plasma CVD apparatus are connected to each other such that the disk in the plasma CVD apparatus can be conveyed into the protective film modification apparatus without the disk being exposed to air. By using the protective film modification apparatus and the plasma CVD apparatus, which are connected to each other such that the disk D in the plasma CVD apparatus can be conveyed into the protective film modification apparatus without the disk being exposed to air, deposition of impurities derived from the air onto the protective film can be prevented, and lowering of the bonding force between the protective film and the lubrication film, which lowering is caused by such impurities, can be prevented.

In the present invention, there may be employed a protective film modification apparatus including coils for generating a magnetic field in a chamber 20, which coils are provided on outer side walls of the chamber 20.

When such a protective film modification apparatus is employed, plasma in the chamber 20 is gathered around the disk D by the effect of the magnetic field generated by the coils during modification of the protective film. Therefore, efficiency in modification of the protective film can be enhanced.

An embodiment of the production process for the magnetic recording medium of the present invention will next be described by taking, as an example, the case in which the aforementioned apparatus is employed.

Firstly, the production process including a step in which a protective film formed through CVD is subjected to modification will be described.
(Embodiment 1 of Production Process)

A non-magnetic undercoat layer 1 and a magnetic layer 2 are successively formed on both surfaces of a non-magnetic substrate S through a technique such as sputtering, vacuum deposition, or ion plating, to thereby obtain a disk D.

An embodiment of the production process for the disk D will be specifically described. The non-magnetic substrate S may be an aluminum alloy substrate on which an NiP plating film is formed (hereinafter the substrate may be referred to as "NiP-plated Al substrate"), which is generally employed as a substrate for magnetic recording media; or a substrate of glass, ceramic, or flexible resin, which substrate may be coated with NiP or another alloy through plating or sputtering. The mean surface roughness (Ra) of the non-magnetic substrate S is preferably 1–20 Å. When the substrate S is subjected to texturing or a similar technique, a desired mean surface roughness (Ra) can be attained.

The aforementioned respective layers are formed under, for example, the sputtering conditions described below. A chamber in which the layers are formed is evacuated to $10^{-4}$ to $10^{-7}$ [Pa]. The substrate is placed in the chamber, and then the substrate is heated to, for example 200–250° C., so as to attain a desired coercive force. Subsequently, Ar gas is introduced into the chamber and discharge is carried out, to thereby carry out sputtering for film formation. When sputtering is carried out, power of 0.2–2.0 [kW] is supplied. The discharge time and the supply power may be regulated, to thereby attain a desired film thickness.

The non-magnetic undercoat layer 1 is a conventionally known non-magnetic undercoat layer. For example, the layer 1 is a single element film formed from any element selected from Cr, Ti, Ni, Si, Ta, and W. Alternatively, the layer 1 is a film formed from an alloy containing any of the above elements as a primary component and other elements, so long as such "other elements" do not impede the crystallinity of the layer 1. The non-magnetic undercoat layer 1 is provided for controlling the crystal orientation of the magnetic layer 2 formed from a Co alloy. The layer 1 is preferably formed from a sputtering target containing a material of solely Cr or a material containing Cr and one or more selected from among Mo, W, V, Ti, Nb, and Si. When the aforementioned material is employed, the crystal orientation of the magnetic layer 2 formed from a Co alloy, the layer 2 being provided on the non-magnetic undercoat layer 1, is improved, and therefore the magnetic recording medium exhibits excellent coercive force and noise characteristics; i.e., the medium is suitable for realization of high recording density.

The crystal grain size of the non-magnetic undercoat layer 1 may affect the crystal grain size of the magnetic layer 2 formed from a Co alloy. The crystal grain size of the non-magnetic undercoat layer 1 may be reduced by employing a sputtering target containing an element such as B, Zr, or Ta and the material of the layer 1; i.e., Cr or a Cr alloy.

The thickness of the non-magnetic undercoat layer 1 is not particularly limited, so long as the thickness falls within a range so as to attain a appropriate coercive force. The thickness is preferably 100–1,000 Å, more preferably 150–700 Å. The magnetic recording medium including the non-magnetic undercoat layer 1 having a thickness falling within the above range exhibits enhanced coercive force and improved SNR; i.e., the medium is suitable for realization of high recording density, which is preferable.

The non-magnetic undercoat layer 1 may be of a single-layer structure, or of a multi-layer structure. When the layer 1 has a multi-layer structure, the layer 1 may be formed of a plurality of layers formed from the same composition or different compositions from among the aforementioned compositions. For example, the layer 1 may be a multi-layer structure in which a CrMo alloy layer (Mo content: 10 at % or less) is laminated on a Cr layer.

The magnetic layer 2 formed from a Co alloy may be formed from a material containing any Co alloy composition selected from among Co/Cr, Co/Cr/Ta, Co/Cr/Pt, Co/Cr/Pt/Ta, and the like.

The thickness of the magnetic layer 2 formed from a Co alloy falls within a range of 30–100 [G$\mu$m], which is a parameter of conventionally used Brd (the product of residual magnetization and film thickness [G$\mu$m]), and the thickness of the layer 2 may be regulated so as to attain an appropriate recording and reproducing signal output.

In order to carry out film formation efficiently and consistently, if necessary, a bias of −200 to −400 [V] is preferably applied to the non-magnetic substrate S during formation of the non-magnetic undercoat layer 1 and the magnetic layer 2.

In order to improve the orientation of the Co alloy and to obtain high coercive force, a non-magnetic intermediate layer may be provided between the non-magnetic undercoat layer 1 and the magnetic layer 2. For example, a CoCr alloy layer (Cr content: 50 at % or less) having a thickness of 25 Å or less may be formed.

The formation process for a protective film will next be described.

The disk D including the substrate S, the undercoat layer 1, and the magnetic layer 2 is conveyed to a predetermined position in the CVD apparatus chamber 10 by means of an unillustrated conveying apparatus. Meanwhile, a reaction gas supplied from the supply source is fed through the feeding pipes 15, 15 into the CVD apparatus chamber 10, and the existing gas in the CVD chamber 10 is discharged through the discharge pipe 16. Thus, the reaction gas is passed throughout the CVD apparatus chamber 10, to thereby expose the surfaces of the disk D to the reaction gas.

The reaction gas may be a hydrocarbon-containing gas; for example, a gas containing, as a primary component, a gas mixture of hydrocarbon and hydrogen. In the gas mixture, the volume ratio of hydrocarbon to hydrogen is preferably set at 2:1–1:100, in order to obtain a harder and more durable protective film predominantly containing carbon. As used herein, the term "a gas containing a gas mixture as a primary component" refers to the gas mixture being contained in the gas in an amount of 90 vol % or more.

One or more selected from among lower saturated hydrocarbons, lower unsaturated hydrocarbons, and lower cyclic hydrocarbons are preferably employed as the aforementioned hydrocarbon. Examples of lower saturated hydrocarbons which may be employed include methane, ethane, propane, butane, and octane. Examples of lower unsaturated hydrocarbons which may be employed include isoprene, ethylene, propylene, butylene, and butadiene. Examples of lower cyclic hydrocarbons which may be employed include benzene, toluene, xylene, styrene, naphthalene, cyclohexane, and cyclohexadiene. As used herein, the term "lower hydrocarbon" refers to a hydrocarbon of C1–C10.

A lower hydrocarbon is preferably employed as the hydrocarbon, for the reasons described below. When the number of carbons in the hydrocarbon is in excess of the upper limit of the aforementioned range, the hydrocarbon becomes difficult to feed in the form of gas, and the hydrocarbon is not easily decomposed during discharge. As a result, the protective film predominantly containing carbon contains a large amount of polymer components having poor strength.

In the formation process, the pressure in the CVD chamber 10 is preferably adjusted to fall within a range of 0.1–10 Pa, by appropriately controlling the discharge rate of the gas from the chamber 10 by use of the discharge amount control valve 17. In addition, the flow rate of the reaction gas is preferably 50–500 sccm.

Simultaneously, high-frequency power, preferably 50–2,000 W, is supplied to the electrodes 11, 11 by use of the high-frequency power sources 12, 12, to thereby generate plasma in the chamber. A protective film predominantly containing carbon is formed on each surface of the disk D through plasma chemical vapor deposition making use of the aforementioned reaction gas serving as a raw material.

The thickness of the protective film is 30–100 Å, preferably 30–75 Å. When power is supplied to the electrodes 11, 11, the phases of power supplied to the electrodes 11, 11 are preferably different from each other. This is because the rate of film formation and durability of the protective film can be improved when the phases are different. The difference between the phases of power supplied to the electrodes 11, 11 is preferably 90–270°, more preferably 180° (opposite phase).

Alternatively, the protective film predominantly containing carbon may be formed through usually employed CVD.

When the protective film is formed by use of the plasma CVD apparatus, the film contains a large amount of a diamond-like carbon (hereinafter referred to as "DLC") component having high hardness, and thus the protective film exhibits excellent strength. Active portions on the surface of the thus-formed carbon protective film are hydrogenated, and thus the film contains a large amount of C—H bonds that are not easily polarized; i.e., the chemical activity of the surface of the film is low.

In the production process of the embodiment, the disk D on which the carbon protective film is formed is conveyed into the chamber 20 of the protective film modification apparatus shown in FIG. 5, and the carbon protective film is subjected to etching by use of a protective film modification gas under conditions such that the extraction amount of an inspection gas component and/or a compound component formed so as to contain the inspection gas component is equal to or greater than a certain threshold, the gas component and/or the compound component being extracted with an inspection solvent after the carbon protective film is allowed to stand in an atmosphere of the inspection gas component, to thereby produce a magnetic recording medium in which the protective film has undergone modification. When the extracted component is melamine, the threshold is preferably determined to be 0.06 [$\mu$g/100 cm$^2$], more preferably 0.12 [$\mu$g/100 cm$^2$], much more preferably 0.24 [$\mu$g/100 cm$^2$].

As used herein, the term "protective film modification" refers to the protective film being subjected to etching under conditions such that the extraction amount of an inspection gas component and/or a compound component formed so as to contain the inspection gas component is equal to or greater than a certain threshold, the gas component and/or the compound component being extracted with an inspection solvent after the carbon protective film is allowed to stand in an atmosphere of the inspection gas component.

The protective film modification gas may contain one or more selected from among Ar gas, oxygen gas, and nitrogen gas.

According to the magnetic recording medium including the carbon protective film which has been modified through protective film modification, the extraction amount is equal to or greater than the threshold, and thus the amount of the inspection gas adsorbed in the protective film is large. The reason for this is thought to be as follows.

When the protective film is exposed to plasma of the protective film modification gas through protective film modification, a large number of C—H bonds present in the carbon protective film are cleaved by the plasma, and the resultant C atoms are bonded to nitrogen. In accordance with the type of the employed modification gas, a C—O bond, a C=O bond, a C=C bond, a C≡C bond, a C=N bond, a C≡N bond, or a similar bond is formed. These bonds are considered to have high chemical activity. The inspection gas is considered to be adsorbed onto such a highly active site. Meanwhile, from the surface to the inside of the protective film exposed to the modification gas, micropores are thought to be formed by the effect of the modification gas. Since the micropores cause an increase in the effective surface area of the protective film in relation to adsorption, the protective film exhibits characteristic so as to increase the adsorption amount of the inspection gas.

Therefore, the amount of the inspection gas adsorbed in the carbon protective film which has undergone modification increases. In addition, the amount of the inspection gas adsorbed in the carbon protective film which has undergone modification satisfactorily is thought be equal to or greater than the threshold.

While the protective film modification gas supplied from a non-illustrated source is introduced into the chamber through the feeding pipe, the existing gas in the chamber is discharged through the discharge pipe, and the modification gas is passed throughout the chamber, to thereby expose to the protective film modification gas the surface of the carbon protective film formed on each of the surfaces of the disk.

During protective film modification, the pressure in the chamber is preferably adjusted to fall within a range of 2.4–8 Pa (more preferably 2.4–6 Pa), by appropriately controlling the discharge amount of the gas from the chamber by use of the discharge amount control valve. When the pressure in the chamber is below the above range, modification of the surface of the protective film is unsatisfactory, and thus the amount of deposits adsorbed in the film does not increase, and deposits are easily deposited onto the surface of the film. In contrast, when the pressured in the chamber is in excess of the above range, the surface of the protective film becomes chemically unstable, and thus durability of the film may be lowered.

During protective film modification, high-frequency power of preferably 30–500 W (more preferably 30–300 W, much more preferably 30–200 W) is supplied to the electrodes by use of the high-frequency power supply, to thereby generate plasma of the aforementioned nitrogen gas serving as a raw material. The surface of the carbon protective film of the disk is subjected to modification by use of the resultant plasma.

When the power supplied to the disk is below the above range, modification of the surface of the protective film is unsatisfactory, and thus the amount of deposits adsorbed in the film does not increase, and deposits are easily deposited onto the surface of the film. In contrast, when the power is in excess of the above range, the surface of the protective film becomes chemically unstable, and thus durability of the film may be lowered.

The time for protective film modification is 2–6 seconds, preferably 3–5 seconds. When the time for protective film modification is below the above range, modification of the surface of the protective film is unsatisfactory, and thus the amount of deposits adsorbed in the film does not increase, and deposits are easily deposited onto the surface of the film. In contrast, when the modification time is in excess of the above range, the surface of the protective film becomes chemically unstable, and thus durability of the film may be lowered.

The protective film predominantly containing carbon is subjected to modification under conditions such that the intensity of the peak corresponding to a carbon-hydrogen bond of the infrared spectrum of the surface of the film is preferably 0.055 or less, more preferably 0.05 or less, much more preferably 0.04 or less. This is because, when a lubricant is applied onto such a modified protective film predominantly containing carbon, bonding between the film and the lubricant can be strengthened, and deposition of the lubricant onto a magnetic head can be suppressed.

When the protective film is subjected to modification, the power supplied to the disk, the modification time, or the pressure in the chamber is regulated, to thereby control the water contact angle of the surface of the protective film. The water contact angle of the surface of the protective film is preferably 80° or less, more preferably 75° or less. This is because, when the water contact angle is 80° or less, the protective film is satisfactorily bonded to the lubricant, and thus the lubricant is not easily deposited onto a magnetic head.

When impurities that induce deposition of deposits onto the surface of the protective film are deposited onto the film after the film is formed on the disk in the plasma CVD apparatus, the impurities are removed from the surface of the protective film by plasma generated from the protective film modification gas during protective film modification. Therefore, deposits are not easily deposited onto the protective film.

When nitrogen gas is employed as the protective film modification gas, plasma is generated from the nitrogen gas by power supplied to the electrodes, and bonds in the carbon protective film are cleaved by the resultant plasma, to thereby form a carbon nitride compound, which is preferable. The reason why nitrogen gas is employed as the protective film modification gas is that the carbon protective film is easily designed; i.e., variance in the thickness of the protective film can be suppressed, since a compound which is easily gasified is not easily formed when nitrogen gas is bonded to the component of the protective film. When the protective film is subjected to modification, the modification conditions are determined such that the ratio of nitrogen to carbon in the protective film, as measured by means of ESCA, is preferably 5–40%, more preferably 5–25%, much more preferably 13–25%. When the ratio of nitrogen to carbon is below the above range, modification of the surface of the protective film is unsatisfactory, and thus the amount of deposits adsorbed in the film does not increase, and deposits are easily deposited onto the surface of the film. In addition, the activity of the surface of the protective film is lowered, bonding between the film and the lubricant is weakened, the lubricant is easily deposited onto a magnetic head, and thus fly stiction characteristic is impaired, which is not preferable.

When the carbon protective film is subjected to modification by use of nitrogen gas, the film is preferably subjected to modification under conditions such that the protective film contains nitrogen in an amount of 2 at % or less in the vicinity of a surface of the film, the surface being brought into contact with the magnetic layer. This is because, when the amount of nitrogen falls outside the above range, magnetostatic characteristics of the magnetic layer deteriorate and coercive force is lowered, and thus the magnetic recording medium is not suitable for realization of low flying height.

According to the protective film predominantly containing carbon formed in the CVD apparatus, the Id/Ig value as measured through Raman spectroscopy is 3.5 or less. Therefore, the protective film is subjected to modification under conditions such that the Id/Ig value is preferably 3.5 or less, more preferably 3.0 or less, much more preferably 2.5 or less.

Subsequently, a lubricant such as perfluoropolyether is applied onto the protective film through, for example, dipping, to thereby form a lubrication film and produce a magnetic recording medium. The lubrication film formed on the protective film is strongly bonded to the surface of the protective film. The lubrication film is formed on the protective film predominantly containing carbon. The lubrication film is formed by applying a lubricant onto the protective film through a conventionally known technique such as dipping or spin coating. The lubricant may be a material containing any lubricant selected from among a Fomblin-type lubricant, a Gaudi-type lubricant, a Demnum-type lubricant, and a Krytox-type lubricant.

(Embodiment 2 of Production Process)

Another embodiment of the production process for the magnetic recording medium will next be described by taking, as an example, the case in which protective film modification is not carried out.

The disk D including the substrate S, the undercoat layer 1, and the magnetic layer 2 is conveyed to a predetermined position in the CVD apparatus chamber 10 by means of an unillustrated conveying apparatus. Meanwhile, a reaction gas supplied from the supply source is fed through the feeding pipes 15, 15 into the CVD apparatus chamber 10, and the existing gas in the chamber 10 is discharged through the discharge pipe 16. Thus, the reaction gas is passed throughout the CVD apparatus chamber 10, to thereby expose the surfaces of the disk D to the reaction gas.

When a protective film predominantly containing carbon is formed in a manner similar to that described above, the film may be formed while pulse direct-current bias is applied to the disk D, in order to increase the amount of deposits adsorbed in the film; i.e., in order to cause the extraction amount of the deposits to at least a certain threshold. When the protective film is formed while pulse direct-current bias is applied to the disk D, the extraction amount of an inspection gas component and/or a compound component formed so as to contain the inspection gas component becomes equal to or greater than a certain threshold, the gas component and/or the compound component being extracted with an inspection solvent after the carbon protective film is allowed to stand in an atmosphere of the inspection gas component. The protective film is formed while pulse direct-current bias is applied to the disk D, so as to attain a threshold (in the case in which the extracted component is melamine) of preferably 0.06 [$\mu$g/100 cm$^2$], more preferably 0.12 [$\mu$g/100 cm$^2$], much more preferably 0.24 [$\mu$g/100 cm$^2$].

When bias is applied to the disk, plasma sufficiently impinges on the surface of the disk, and thus the temperature of the disk is elevated and a carbon-hydrogen bond is dissociated. In addition, when plasma impinges directly on the surface of the disk, the carbon-hydrogen bond is easily dissociated; i.e., the carbon-hydrogen bond is efficiently dissociated, and thus the amount of deposits adsorbed in the protective film can be increased. According to a conventional acceleration method in which grid voltage is applied in thermionic emission plasma generation, a carbon-hydrogen bond is not dissociated when plasma impinges directly on the surface of the disk D, and thus the amount of deposits adsorbed in the protective film cannot be increased. When bias is applied to the disk D, the bias may be applied directly to the disk D, or may be applied to the disk D via a non-illustrated disk carrier (i.e., an apparatus for carrying and conveying the disk D).

The pulse direct-current bias applied to the disk D has a mean voltage of −450 to −60 V, preferably −400 to −150 V, more preferably −350 to −200 V.

When the mean voltage is below the lower limit of the above range, plasma impinges on the surface of the disk D very strongly to thereby hinder activated species of the reaction gas excited by plasma from depositing on the disk D. As a result, the protective film predominantly containing carbon tends to have insufficient density and poor sliding durability.

In contrast, when the mean voltage is in excess of the upper limit of the above range, plasma impinges on the surface of the disk D very weakly, and modification of the protective film is unsatisfactory, and thus the amount of deposits adsorbed in the film does not increase; i.e., the deposits are easily deposited onto the surface of the film.

When the protective film predominantly containing carbon is formed, the temperature of the substrate is determined at 130° C. or higher, preferably 150° C. or higher, more preferably 170° C. or higher. When the temperature of the substrate is below the lower limit of the above range, the heat quantity of the substrate is small, and thus dissociation of a carbon-hydrogen bond by the heat (i.e., heat elimination of hydrogen) does not easily occur. As a result, modification of the protective film is unsatisfactory, and thus the amount of deposits adsorbed in the film does not increase; i.e., the deposits are easily deposited onto the surface of the film.

As described above, when the mean voltage of the pulse direct-current bias falls within the above range, plasma impinges on the surface of the disk D appropriately. In addition, when the temperature of the substrate falls within the above range, dissociation of a carbon-hydrogen bond (i.e., heat elimination of hydrogen) easily occurs. As a result, modification of the protective film is satisfactory, and thus the amount of deposits adsorbed in the film increases; i.e., the deposits are not easily deposited onto the surface of the film.

Moreover, the bias is applied to the disk D under conditions such that the intensity of the peak corresponding to a carbon-hydrogen bond of the infrared spectrum of the surface of the protective film is preferably 0.055 or less, more preferably 0.05 or less, much more preferably 0.04 or less. This is because, when a lubricant is applied onto such a protective film predominantly containing carbon, bonding between the film and the lubricant can be strengthened, and deposition of the lubricant onto a magnetic head can be suppressed.

When the protective film predominantly containing carbon is formed, a high-frequency power source may be employed as the bias power source 13, and instead of pulse direct-current bias, high-frequency bias may be applied to the disk. In this case, the high-frequency power applied to the disk is 10–300 W, preferably 10–150 W. The frequency may be an Rf frequency, of, for example, 13.56 MHz.

The aforementioned pulse direct-current bias has a positive voltage peak value; i.e., a peak value in a positive region of a pulse portion, of 10–100 V, preferably 20–75 V. When the peak value is below the lower limit of the above range, a positive bias voltage cannot sufficiently cancel negative charges accumulated on the surface of the disk, and deposition of the activated species on the disk is hindered. As a result, the protective film predominantly containing carbon tends to have insufficient density and poor sliding durability.

The positive voltage peak value of the pulse direct-current bias, the pulse width, and the frequency are regulated such that the Id/Ig value in relation to the protective film predominantly containing carbon, which value is obtained through Raman spectroscopy, is preferably 3.5 or less, more preferably 3.0 or less, much more preferably 2.5 or less.

When the positive voltage peak value is in excess of the upper limit of the above range, reverse-sputtering tends to occur on the disk D and the protective film predominantly containing carbon tends to have insufficient density and poor sliding durability.

Thus, when the positive voltage peak value of the pulse direct-current bias falls within the above range, a positive bias voltage can cancel negative charges accumulated on the surface of the disk, and can promote the deposition of the activated species on the disk. As a result, the protective film predominantly containing carbon becomes dense and improves in sliding durability.

The pulse direct-current bias has a frequency of 1 kHz–100 GHz, preferably 10 kHz–1 GHz. When the frequency is below the lower limit of the above range, a positive bias voltage cannot sufficiently cancel negative charges accumulated on the surface of the disk D, and deposition of the activated species on the disk D is hindered. As a result, the protective film predominantly containing carbon tends to have insufficient density and poor sliding durability. In contrast, when the frequency is in excess of the upper limit of the above range, reverse-sputtering tends to occur on the surface of the disk D and the protective film tends to have insufficient density and poor sliding durability.

The pulse direct-current bias has a pulse width of 1 ns–500 µs, preferably 10 ns–50 µs. When the pulse width is below the lower limit of the above range, a positive bias voltage cannot sufficiently cancel negative charges accumulated on the surface of the disk D, and deposition of the activated species on the disk D is hindered. As a result, the protective film predominantly containing carbon tends to have insufficient density and poor sliding durability. In contrast, when the pulse width is in excess of the upper limit of the above range, reverse-sputtering tends to occur on the surface of the disk D and the protective film tends to have insufficient density and poor sliding durability.

Figure 7:
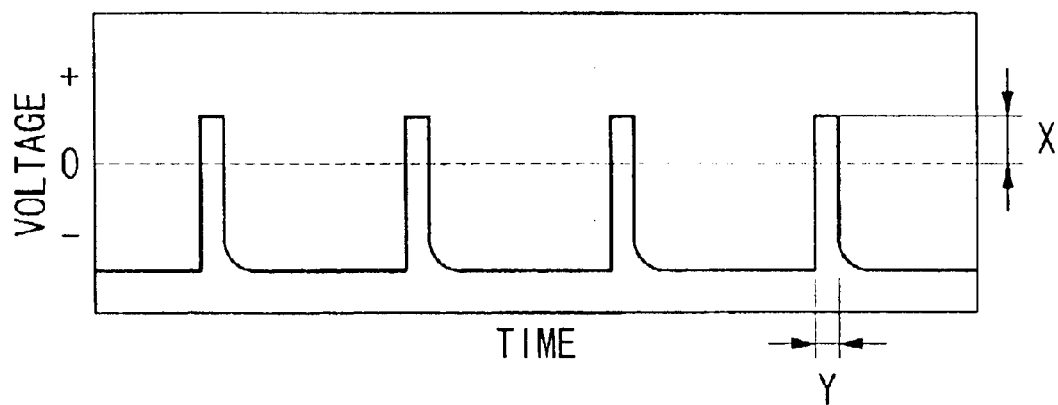
FIG. 7 illustrates the mean voltage and the positive voltage peak value of pulse direct-current bias.

As used herein, the term "positive voltage peak value of pulse direct-current bias" refers to, for example, a peak value X in a positive region in a pulse portion of a voltage waveform of a pulse direct-current bias shown in FIG. 7. In this case, a pulse width refers to a width Y in the pulse portion.

When the protective film is formed through application of bias, conditions of applied bias are controlled, as are other conditions such as the treatment time and the pressure in the chamber, to thereby control the water contact angle of the surface of the protective film. The water contact angle of the surface of the protective film is preferably 80° or less, more preferably 75° or less. This is because, when the water contact angle is 80° or less, the protective film is satisfactorily bonded to the lubricant, and thus the lubricant is not easily deposited onto a magnetic head.

In a manner similar to that described above, a lubrication film is formed on the protective film predominantly containing carbon, which is formed on the disk.

(Embodiment 3 of Production Process)

Another embodiment of the production process for the magnetic recording medium will next be described by taking, as an example, the case in which sputtering is carried out in combination with application of bias.

After the disk D is obtained in a manner similar to that described above, a protective film is formed as described below.

Figure 6:
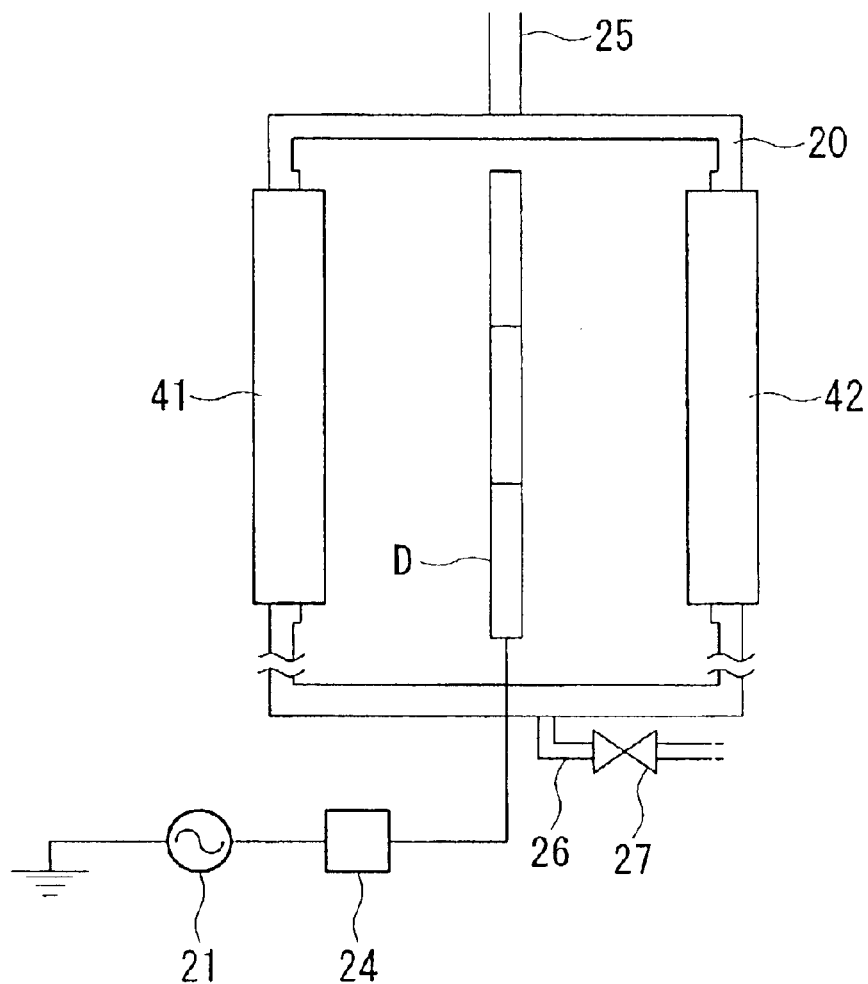
FIG. 6 is a schematic representation showing a sputtering apparatus employed for carrying out one embodiment of the production process for a magnetic recording medium of the present invention.

In the production process of the embodiment, a disk D2—which is obtained by forming a carbon protective film on the disk D through CVD in a manner similar to that of any of the aforementioned embodiments—is conveyed into a sputtering chamber including a sputtering target containing a carbon-containing material and having means for introducing into the chamber, as a sputtering gas, Ar gas or a gas mixture containing Ar gas and nitrogen gas, and plasma of the gas is generated through discharge, to thereby form another protective film predominantly containing carbon on the surface of the disk D2 through sputtering. During sputtering, bias is applied to the disk under conditions such that the extraction amount of an inspection gas component and/or a compound component formed so as to contain the inspection gas component is equal to or greater than a certain threshold, the gas component and/or the compound component being extracted with an inspection solvent after the carbon protective film is allowed to stand in an atmosphere of the inspection gas component, to thereby form the protective film. When the extracted component is melamine, the threshold is preferably determined to be 0.06 [$\mu$g/100 cm$^2$], more preferably 0.12 [$\mu$g/100 cm$^2$], much more preferably 0.24 [$\mu$g/100 cm$^2$]. The protective film may be formed by use of the apparatus shown in FIG. 6. In FIG. 6, reference numerals 41 and 42 represent sputtering targets, and reference numeral 21 represents a bias power supply for applying bias to the disk D2.

When the protective film predominantly containing carbon is formed through sputtering while bias is applied to the disk, the protective film is formed while the surface of film is impinged with plasma. In addition, the protective film formed on the disk through CVD is modified. As a result, the thus-formed film has a large amount of micropores; i.e., the film has a large effective area in relation to adsorption, and thus the film can adsorb a sufficient amount of deposits therein.

According to the magnetic recording medium produced as descried above, the extraction amount of an inspection gas component and/or a compound component formed so as to contain the inspection gas component is equal to or greater than a certain threshold, the gas component and/or the compound component being extracted with an inspection solvent after the medium is allowed to stand in an atmosphere of the inspection gas component.

The high-frequency power applied to the disk is 100–400 W, preferably 100–200 W. The frequency may be an Rf frequency, of, for example, 13.56 MHz. When the high-frequency power falls within the above range, the protective film has a sufficient amount of micropores, and thus the film can adsorb a sufficient amount of deposits therein.

A pulse direct-current bias similar to that shown in FIG. 7 may be applied to the disk. The pulse direct-current bias applied to the disk D preferably has a mean voltage of −450 to −60 V, more preferably −400 to −150 V, much more preferably −350 to −200 V. When the mean voltage of the pulse direct-current bias falls within the above range, plasma impinges on the surface of the disk D appropriately, and thus the resultant protective film has a large effective surface area in relation to adsorption. As a result, the amount of deposits adsorbed in the film increases, and the deposits are not easily deposited onto the surface of the film.

The temperature of the substrate is preferably 130° C. or higher, more preferably 150° C. or higher. When the temperature of the substrate falls within the above range, the resultant protective film has a large effective surface area in relation to adsorption. As a result, the amount of deposits adsorbed in the film increases, and the deposits are not easily deposited onto the surface of the film.

The aforementioned pulse direct-current bias has a positive voltage peak value; i.e., a peak value in a positive region of a pulse portion, of 10–100 V, preferably 20–75 V. The pulse direct-current bias has a frequency of 1 kHz–100 GHz, preferably 10 kHz–1 GHz. The pulse direct-current bias has a pulse width of 1 ns–500 $\mu$s, preferably 10 ns–50 $\mu$s. When the positive voltage peak value, the frequency, and the pulse width fall within the above ranges, plasma impinges on the surface of the disk D appropriately, and thus the resultant protective film has a large effective surface area in relation to adsorption. As a result, the amount of deposits adsorbed in the film increases, and the deposits are not easily deposited onto the surface of the film.

When a gas mixture containing Ar gas and nitrogen gas is employed as a sputtering gas, the conditions for sputtering are preferably determined such that the ratio of nitrogen to carbon contained in the protective film, as measured by means of ESCA, is preferably 5–40%, more preferably 5–25%, much more preferably 13–25%. When the ratio of nitrogen to carbon is below the above range, modification of the surface of the protective film is unsatisfactory, and thus the amount of deposits adsorbed in the film does not increase, and deposits are easily deposited onto the surface of the film. In addition, the activity of the surface of the protective film is lowered, bonding between the film and the lubricant is weakened, the lubricant is easily deposited onto a magnetic head, and thus fly stiction characteristic is impaired, which is not preferable.

When a gas mixture containing Ar gas and nitrogen gas is employed as a sputtering gas, preferably, the protective film predominantly containing carbon has a carbon nitride compound on a first surface thereof, the surface being opposite the magnetic layer, and the protective film contains nitrogen in an amount of 2 at % or less in the vicinity of a second surface thereof, the surface being brought into contact with the magnetic layer. This is because, when the amount of nitrogen falls outside the above range, coercive force, which is one of magnetostatic characteristics, is lowered, and thus the magnetic recording medium is not suitable for realization of low flying height.

When the protective film is formed through sputtering, other conditions for sputtering are determined, for example, as described below. The chamber in which the film is formed is evacuated to $10^{-4}$ to $10^{-7}$ [Pa]. The substrate which has been heated in the previous step is placed in the chamber. While Ar gas and nitrogen gas are introduced into the chamber so as to attain a pressure of 0.5–1.0 [Pa], plasma is generated through discharge, and a target containing a carbon-containing material is employed as a raw material, to thereby form a film through sputtering. During sputtering, power of 0.2–2.0 [kW] is supplied. The protective film having a desired thickness may be formed by regulating the discharge time and the power which is supplied. When the protective film is formed through sputtering, the power which is supplied is 0.2–2.0 [kW], preferably 0.7–1.8 [kW]. When the power is less than 0.2 [kW], a satisfactory thickness is not attained, whereas when the power is in excess of 2.0 [kW], the protective film formed through sputtering may have low density. In addition, when the power is in excess of 2.0 [kW], a carbon nitride compound formed through sputtering diffuses in the protective film in a direction toward the magnetic layer, and the protective film may contain nitrogen in an amount of more than 2 at % in the vicinity of a surface thereof, the surface being brought into contact with the magnetic layer.

The carbon protective film formed through CVD, the film being included in the disk D2, preferably has a thickness of 10–60 Å. This is because, when the thickness is less than 10 Å, satisfactory strength is not obtained, and a carbon nitride compound formed through sputtering diffuses in the protective film in a direction toward the magnetic layer, and the protective film may contain nitrogen in an amount of more than 2 at % in the vicinity of a surface thereof, the surface being brought into contact with the magnetic layer.

The protective film predominantly containing carbon is formed through sputtering under conditions such that the intensity of the peak corresponding to a carbon-hydrogen bond of the infrared spectrum of the surface of the protective film is preferably 0.055 or less, more preferably 0.05 or less, much more preferably 0.04 or less. This is because, when a lubricant is applied onto such a protective film predominantly containing carbon, bonding between the film and the lubricant can be strengthened, and deposition of the lubricant onto a magnetic head can be suppressed.

When the protective film is formed through sputtering while bias is applied to the disk, conditions of applied bias, sputtering conditions, and other conditions such as treatment time and pressure in the chamber are regulated, to thereby control the water contact angle of the surface of the protective film. The water contact angle of the surface of the protective film is preferably 80° or less, more preferably 75° or less. This is because, when the water contact angle is 80° or less, the protective film is satisfactorily bonded to the lubricant, and thus the lubricant is not easily deposited onto a magnetic head.

In a manner similar to that described above, a lubrication film is formed on the protective film predominantly containing carbon, which is formed on the disk.

(Another Embodiment of the Production Process)

In the aforementioned embodiment 3 of the production process, a protective film may be formed through a conventional sputtering process, instead of through the CVD process.

Since a film similar to that formed in the embodiment 3 is formed on the surface of the protective film, the aforementioned effect may be obtained.

Alternatively, in the aforementioned embodiment 3 of the production process, instead of a protective film being formed through CVD, a protective film may be formed through sputtering while bias is applied. Since a film similar to that formed in the embodiment 3 is formed on the surface of the protective film, the aforementioned effect may be obtained. When a gas mixture containing Ar gas and nitrogen gas is employed as a sputtering gas, preferably, the protective film predominantly containing carbon has a carbon nitride compound on a first surface thereof, the surface being opposite to the magnetic layer, and the protective film contains nitrogen in an amount of 2 at % or less in the vicinity of a second surface thereof, the surface being brought into contact with the magnetic layer. This is because, when the amount of nitrogen falls outside the above range, coercive force, which is one of magnetostatic characteristics, is lowered, and thus the magnetic recording medium is not suitable for realization of low flying height. In order to avoid such a problem, for example, the protective film may be firstly formed by use of a gas containing no nitrogen gas, and then formed by use of a gas containing nitrogen gas.

According to the magnetic recording medium produced through the production process of the aforementioned embodiment, the extraction amount of an inspection gas component and/or a compound component formed so as to contain the inspection gas component is equal to or greater than a certain threshold, the gas component and/or the compound component being extracted with an inspection solvent after the carbon protective film is allowed to stand in an atmosphere of the inspection gas component. Therefore, the protective film predominantly containing carbon of the magnetic recording medium is not prone to have deposits on its surface. When the extracted component is melamine, the threshold is preferably 0.06 [µg/100 cm$^2$]. Since deposits are not deposited onto a magnetic head even when the flying height of the head is reduced, fly stiction characteristic of the magnetic recording medium is not impaired even in the case in which the flying height of the head is reduced. When the carbon protective film is subjected to FTIR, the intensity of the peak corresponding to a carbon-hydrogen bond is preferably 0.055 or less. Therefore, the surface of the protective film is consistently coated with a lubricant, and thus deposition of deposits can be suppressed. The carbon protective film 3 contains nitrogen, and the ratio of nitrogen to carbon as measured by means of ESCA is preferably 5–40%. Therefore, the film is dense and hard. Preferably, the magnetic recording medium of the present invention includes the protective film predominantly containing carbon, which film is hard and thin, exhibits excellent sliding durability and lubricity, and suppresses generation of wear powder, inducing deposition of deposits and generation of Ni corrosion.

According to the present invention, there can be produced a magnetic recording medium which enables reduction in spacing loss, which medium is applicable to realization of high recording density, as compared with a conventional magnetic recording medium.

When the magnetic recording medium produced through the process according to the present invention is employed, the flying height of a magnetic head can be reduced, and thus the coercive force (Hc) of the medium is preferably enhanced so as to be commensurate with the flying height. In order to realize high recording density, the coercive force of the medium is 3,000 oersteds or more, preferably 3,500 oersteds or more. A desired coercive force can be attained by regulating the composition of the aforementioned undercoat layer and magnetic layer, film thickness, film structure, and film formation conditions, within the aforementioned ranges.

A magnetic recording medium which is not prone to have deposits on its surface can be easily produced when the medium is produced such that the extraction amount in relation to the medium is equal to or greater than a certain threshold that has been determined through a pretest; for example, when the medium is produced such that the extraction amount in relation to the medium is equal to or greater than the extraction amount in relation to a magnetic recording medium which has deposits on its surface during a fly stiction test. The degree of difficulty in deposition of deposits can be determined through the inspection method of the present invention, and thus the degree can be used as an index for controlling production of a magnetic recording medium which is not prone to have deposits on its surface. When the index is used, the production process is appropriately controlled, and thus such a magnetic recording medium can be easily produced.

According to the inspection method of the present invention, the degree of difficulty in deposition of deposits onto the protective film can be acceleratedly inspected within a short period of time. Therefore, the inspection results can be reflected in the production process for a magnetic recording medium within a short period of time, without inspection for generation of deposits on a magnetic recording medium which has been practically used for a prolonged period of time. Thus, a magnetic recording medium can be produced to have consistent characteristics.

Therefore, a magnetic recording medium—which exhibits excellent fly stiction characteristic, enables reduction in flying height, and is suitable for realization of high recording density—can be easily produced.

The present invention will next be described in more detail by way of examples, which should not be construed as limiting the invention thereto.

EXAMPLE 1 (A PROTECTIVE FILM IS SUBJECTED TO MODIFICATION BY USE OF NITROGEN GAS AFTER THE FILM IS FORMED THOUGH CVD)

A surface of an NiP-plated Al substrate (diameter: 95 mm, thickness: 0.8 mm) was subjected to texturing so as to attain a mean surface roughness (Ra) of 6 Å, and then the substrate was placed in a chamber of a film formation apparatus (model: 3010, product of ANELVA). After the chamber was evacuated to $2.0 \times 10^{-6}$ Pa, a non-magnetic undercoat layer (thickness: 350 Å) was formed on the substrate from Cr. On the undercoat layer, a magnetic film (thickness: 250 Å) was formed from a Co16Cr6Pt3Ta layer (Cr content: 16 at %, Pt content: 6 at %, Ta content: 3 at %, Co: balance). Before formation of the non-magnetic undercoat layer, the substrate was heated by use of a heater such that the temperature of the substrate was 150° C. during formation of a protective film predominantly containing carbon. The temperature of the substrate was measured by use of a radiation thermometer, and was verified through a window of the chamber immediately before formation of the protective film.

Subsequently, a disk D produced as described above was conveyed into a CVD apparatus. A hydrogenated carbon film (thickness: 50 Å), serving as the protective film predominantly containing carbon, was formed on the magnetic film. When the protective film was formed, high-frequency power (frequency: 13.56 MHz) was applied to electrodes, to thereby generate plasma. During formation of the protective film, application of pulse direct-current bias was carried out. The conditions for application of pulse direct-current bias are shown in Table 1.

Subsequently, the disk D on which the carbon protective film was formed was conveyed into a chamber 20 of a protective film modification apparatus, and nitrogen gas serving as a protective film modification gas was supplied to the chamber 20. Simultaneously, high-frequency power (frequency: 13.56 MHz) was applied to the disk D, to thereby generate plasma, and then the carbon protective film formed on each surface of the disk D was subjected to modification.

The conditions for modification are shown in Table 1.

Subsequently, a Fomblin-type lubricant (Zdol2000, product of Ausimont) was applied onto the protective film through dipping so as to attain a thickness of about 15 Å, to thereby form a lubrication layer on the protective film predominantly containing carbon.

EXAMPLE 2 (A PROTECTIVE FILM IS SUBJECTED TO MODIFICATION BY USE OF OXYGEN GAS AFTER THE FILM IS FORMED THOUGH CVD)

The procedure of Example 1 was repeated, except that the conditions in relation to the protective film modification gas were changed as shown in Table 1, to thereby produce a magnetic recording medium.

EXAMPLE 3 (A PROTECTIVE FILM WAS SUBJECTED TO MODIFICATION BY USE OF AR GAS AFTER THE FILM IS FORMED THOUGH CVD)

The procedure of Example 1 was repeated, except that the conditions in relation to the protective film modification gas were changed as shown in Table 1, to thereby produce a magnetic recording medium.

EXAMPLES 4 THROUGH 7 (AFTER A PROTECTIVE FILM IS FORMED THROUGH CVD, ANOTHER PROTECTIVE FILM IS FORMED THROUGH SPUTTERING BY USE OF NITROGEN GAS AND AR GAS)

A disk D was produced in a manner similar to that described in Example 1.

Subsequently, the disk D was conveyed into a CVD apparatus, and a hydrogenated carbon film (thickness: 40 Å), serving as the protective film predominantly containing carbon, was formed on the magnetic film. When the protective film was formed, high-frequency power (frequency: 13.56 MHz, power: 750 W) was applied to electrodes, to thereby generate plasma. During formation of the protective film, application of pulse direct-current bias was carried out.

On the protective film, a protective film containing a carbon nitride compound was formed through sputtering. In Examples 4 and 5, the film was formed while high-frequency bias (frequency: 13.56 MHz) was applied to the disk. In Examples 6 and 7, the film was formed while pulse direct-current bias was applied to the disk. The thickness of the protective film formed through sputtering was 10 Å. The thickness of the protective film formed through CVD was 40 Å. The conditions for formation of the protective film through sputtering are shown in Table 1.

EXAMPLES 8 THROUGH 13 (A PROTECTIVE FILM IS FORMED THROUGH CVD WITH APPLICATION OF PULSE DIRECT-CURRENT BIAS)

A disk D was produced in a manner similar to that described in Example 1.

Subsequently, the disk D was conveyed into a CVD apparatus, and a hydrogenated carbon film (thickness: 50 Å), serving as the protective film predominantly containing carbon, was formed on the magnetic film. When the protective film was formed, high-frequency power (frequency: 13.56 MHz) was applied to electrodes, to thereby generate plasma. In Examples 8 through 11, the protective film was formed while pulse direct-current bias was applied to the disk. In Examples 12 and 13, the protective film was formed while high-frequency bias (frequency: 13.56 MHz) was applied to the disk. The conditions for formation of the protective film are shown in Table 2. Subsequently, a lubrication layer was formed in a manner similar to that described in Example 1.

EXAMPLES 14 THROUGH 16, COMPARATIVE EXAMPLE 1 (A PROTECTIVE FILM IS FORMED THROUGH ONLY SPUTTERING)

A disk D was produced in a manner similar to that described in Example 1.

On the disk D, a protective film predominantly containing carbon was formed through sputtering under the conditions shown in Table 1. In Examples 14 through 16, the protective film was formed while high-frequency bias (frequency: 13.56 MHz, power: 200 W) was applied to the disk. In Comparative Example 1, the protective film was formed without application of bias. The thickness of the protective film predominantly containing carbon was 50 Å. Subsequently, a lubrication layer was formed in a manner similar to that described in Example 1.

COMPARATIVE EXAMPLE 2 (A PROTECTIVE FILM IS FORMED THROUGH CONVENTIONAL CVD)

The procedure of Example 1 was repeated, except that the protective film was not subjected to modification, to thereby produce a magnetic recording medium.

In each Example, before application of the lubricant, the surface of the magnetic recording medium was subjected to infrared spectroscopy before and after formation of the protective film predominantly containing carbon, and the infrared spectrum of the protective film was obtained. Subsequently, the intensity of the peak corresponding to a carbon-hydrogen bond was obtained. The infrared spectrum was measured at a point 20 mm along the radius of the disk. The results are shown in Table 1.

A fly stiction test was carried out in the following manner.

Firstly, a magnetic head (an MR head employed in a practical magnetic recording and reproducing apparatus) was placed on a position 19.5 mm along the radius of the magnetic recording medium, and the medium was rotated at a rotation rate of 7,200 rpm at 40° C. and 80% humidity. Subsequently, the position of the head was moved to a position 44 mm along the radius of the medium, and the medium was allowed to stand for 18 hours while being rotated. Subsequently, the position of the head was returned to the position 19.5 mm along the radius, rotation of the medium was stopped, and then the medium was allowed to stand for six hours. Thereafter, the magnetic recording medium was subjected to one cycle of CSS (contact-start-stop) operation including (a cycle of rising to 7,200 rpm for five seconds, operation at 7,200 rpm for one second, falling for five seconds, and parking for one second). After completion of the fly stiction test, deposition of the lubricant onto the head was evaluated as follows. The head surface facing the disk was observed under an optical microscope (magnification: ×240), and the head having deposits on its surface was counted as "generation of deposits." The results are shown in Tables 1, 2, and 3.

The extraction amount of melamine was measured in the following manner. The magnetic recording medium of each of the Examples and the Comparative Examples was placed on a spindle in a commercially available magnetic recording and reproducing apparatus. Separately, a polyurethane paste (2 g) was mixed with melamine (1 mass %), and the resultant mixture was applied onto a piece of aluminum foil (70 mm×25 mm) and dried. The thus-prepared piece, serving as an impurity gas generation source, was placed in the apparatus together with the medium, and allowed to stand at 80° C. and 20% RH for 30 hours while the medium was rotated at 3,000 rpm. Thereafter, the medium was removed from the apparatus, and was immersed for one hour in ethanol (30 ml) heated at 80° C. The extracted melamine was quantitatively measured by means of a GC-MS apparatus (Automass, product of Nippon Denshi). The results are shown in Tables 1, 2, and 3.

The amount of nitrogen in the surface of the protective film was measured by means of an ESCA apparatus (Sage100, product of Specs), and the ratio of nitrogen to carbon was calculated on the basis of the following formula. The results are shown in Tables 1, 2, and 3.

Ratio of nitrogen to carbon (%)=(N1s peak area)/(C1s peak area)×100

The apparatus and measurement conditions are as follows:

anode: aluminum;

spot size: 2–3 mm; and area: obtained through a fitting method (C: Gaussian fitting, N and O: Gaussian+Lorentz fitting).

The carbon protective film was analyzed through Raman spectroscopy (light source: Ar laser, wavelength: 514.5 nm, output: 100 mW, exposure time: 10 seconds, area: obtained through Gaussian fitting) by use of a Raman spectroscopic apparatus (product of Jobin-Yvon). The results are shown in Tables 1, 2, and 3.

TABLE 1

| | Protective film formation process | CVD protective film formation conditions | Sputtering protective film formation conditions | Modification conditions | Melamine extraction amount [μg/100 cm²] | Ratio of N to C on surface [%] | Intensity of peak corresponding to C—H bond | Id/Ig | Generation of deposits on head [number of head having deposits/number of sample] |
|---|---|---|---|---|---|---|---|---|---|
| Ex. 1 | After formation of a protective film through CVD, the film was subjected to modification by use of $N_2$ gas | RF: 750 W Bias mean voltage: −100 V Bias pulse width: 500 ns Bias pulse frequency: 150 kHz Bias positive voltage: 50 V Gas: C4H6/H2 = 44/143 sccm Pressure: 4.5 Pa | None | RF 120 W, 3 sec $N_2$ gas: 100 sccm Pressure: 4.2 Pa | 1.26 | 17.6 | 0.014 | 1.37 | 0/10 |
| Ex. 2 | After formation of a protective film through CVD, the film was subjected to modification by use of $O_2$ gas | " | " | RF 120 W, 3 sec $O_2$ gas: 100 sccm Pressure: 4.3 Pa | 0.23 | ND (Not Detected) | 0.022 | 0.8 | 3/10 |

TABLE 1-continued

| | Protective film formation process | CVD protective film formation conditions | Sputtering protective film formation conditions | Modification conditions | Melamine extraction amount [μg/100 cm²] | Ratio of N to C on surface [%] | Intensity of peak corresponding to C—H bond | Id/Ig | Generation of deposits on head [number of head having deposits/number of sample] |
|---|---|---|---|---|---|---|---|---|---|
| Ex. 3 | After formation of a protective film through CVD, the film was subjected to modification by use of Ar gas | " | " | RF 120 W, 3 sec Ar gas: 130 sccm Pressure: 4.7 Pa | 0.19 | ND | 0.015 | 1.2 | 3/10 |
| Ex. 4 | After formation of a protective film through CVD, another protective film was formed through sputtering by use of $N_2$ and Ar gas | " | DC 1500 W, 2.0 sec Ar gas: 75 sccm $N_2$ gas: 25 sccm Pressure: 0.73 Pa Rf bias: 200 W | None | 0.48 | 27.3 | ND | 1.85 | 1/10 |
| Ex. 5 | After formation of a protective film through CVD, another protective film was formed through sputtering by use of $N_2$ and Ar gas | " | DC 1500 W, 2.0 sec Ar gas: 75 sccm N2 gas: 25 sccm Pressure: 0.73 Pa Rf bias: 400 W | None | 0.53 | 28.6 | ND | 1.92 | 1/10 |
| Ex. 6 | After formation of a protective film through CVD, another protective film was formed through sputtering by use of $N_2$ and Ar gas | " | DC 1500 W, 2.0 sec Ar gas: 75 sccm $N_2$ gas: 25 sccm Pressure: 0.73 Pa Bias mean voltage: −200 V Bias pulse width: 500 ns Bias pulse frequency: 150 kHz Bias positive voltage: 50 V | None | 0.41 | 23.1 | ND | 1.77 | 1/10 |
| Ex. 7 | After formation of a protective film through CVD, another protective film was formed through sputtering by use of $N_2$ and Ar gas | " | DC 1500 W, 2.0 sec Ar gas: 75 sccm $N_2$ gas: 25 sccm Pressure: 0.73 Pa Bias mean voltage: −300 V Bias pulse width: 500 ns Bias pulse frequency: 150 kHz Bias positive voltage: 50 V | None | 0.48 | 26.5 | ND | 1.84 | 1/10 |

TABLE 2

| | Protective film formation process | CVD protective film formation conditions | Sputtering protective film formation conditions | Modification conditions | Melamine extraction amount [μg/100 cm$^2$] | Ratio of N to C on surface [%] | Intensity of peak corresponding to C—H bond | Id/Ig | Generation of deposits on head [number of head having deposits/number of sample |
|---|---|---|---|---|---|---|---|---|---|
| Ex. 8 | A protective film was a protective formed through CVD with application of bias | RF: 750 W<br>Bias mean voltage: −250 V<br>Bias pulse width: 500 ns<br>Bias pulse frequency: 150 kHz<br>Bias positive voltage: 50 V<br>Gas: C4H6/H2 = 44/143 sccm<br>Pressure: 4.5 Pa | None | None | 0.23 | ND | 0.028 | 1.02 | 3/10 |
| Ex. 9 | A protective film was formed through CVD with application of bias | RF: 750 W<br>Bias mean voltage: −300 V<br>Bias pulse width: 500 ns<br>Bias pulse frequency: 150 kHz<br>Bias positive voltage: 50 V<br>Gas: C4H6/H2 = 44/143 sccm<br>Pressure: 4.5 Pa | None | None | 0.27 | ND | 0.020 | 1.13 | 3/10 |
| Ex. 10 | A protective film was formed through CVD with application of bias | RF: 750 W<br>Bias mean voltage: −700 V<br>Bias pulse width: 500 ns<br>Bias pulse frequency: 150 kHz<br>Bias positive voltage: 50 V<br>Gas: C4H6/H2 = 44/143 sccm<br>Pressure: 4.5 Pa | None | None | 0.29 | ND | 0.013 | 1.31 | 4/10 |
| Ex. 11 | A protective film was formed through CVD with application of bias | RF: 750 W<br>Bias mean voltage: −50 V<br>Bias pulse width: 500 ns<br>Bias pulse frequency: 150 kHz<br>Bias positive voltage: 50 V<br>Gas: C4H6/H2 = 44/143 sccm<br>Pressure: 4.5 Pa | None | None | 0.14 | ND | 0.057 | 0.52 | 6/10 |
| Ex. 12 | A protective film was formed through CVD with application of bias | RF: 750 W<br>Bias RF: 50 W<br>Bias: 13.56 MHz<br>Gas: C4H6/H2 = 44/143 sccm<br>Pressure: 4.5 Pa | None | None | 0.17 | ND | 0.052 | 0.55 | 4/10 |
| Ex. 13 | A protective film was formed through CVD with application of bias | RF: 750 W<br>Bias RF: 150 W<br>Bias: 13.56 MHz<br>Gas: C4H6/H2 = 44/143 sccm<br>Pressure: 4.5 Pa | None | None | 0.20 | ND | 0.031 | 0.93 | 4/10 |

TABLE 3

| | Protective film formation process | CVD protective film formation conditions | Sputtering protective film formation conditions | Modification conditions | Melamine extraction amount [µg/100 cm²] | Ratio of N to C on surface [%] | Intensity of peak corresponding to C—H bond | Id/Ig | Generation of deposits on head [number of head having deposits/number of sample] |
|---|---|---|---|---|---|---|---|---|---|
| Ex. 14 | A protective film was formed through only sputtering | None | DC 1500 W, 11 sec Ar gas: 85 sccm Pressure: 0.70 Pa Rf bias: 200 W | None | 0.32 | ND | ND | 3.38 | 2/10 |
| Ex. 15 | A protective film was formed through only sputtering | None | DC 1500 W, 11 sec Ar gas: 75 sccm N₂ gas: 25 sccm Pressure: 0.73 Pa Rf bias: 200 W | None | 0.56 | 31.8 | ND | 2.33 | 1/10 |
| Ex. 16 | A protective film was formed through only sputtering | None | DC 1500 W, 11 sec 5 vol % CH4 in Ar: 85 sccm Pressure: 0.70 Pa Rf bias: 200 W | None | 0.09 | ND | 0.013 | 1.86 | 6/10 |
| Comp. Ex. 1 | A protective film was formed through only sputtering | None | DC 1500 W, 11 sec 5 vol % CH4 in Ar: 85 sccm Pressure: 0.70 Pa No bias | None | 0.05 | ND | 0.017 | 1.79 | 10/10 |
| Comp. Ex. 2 | A protective film was formed through conventional CVD | RF: 750 W Bias mean voltage: −100 V Bias pulse width: 500 ns Bias pulse frequency: 150 kHz Bias positive voltage: 50 V Gas: C4H6/H2 = 44/143 sccm Pressure: 4.5 Pa | None | None | 0.02 | ND | 0.042 | 0.74 | 10/10 |

INDUSTRIAL APPLICABILITY

According to the inspection method of the present invention, without performance of a time-consuming test, generation of deposits onto a magnetic head can be easily inspected by comparing a predetermined threshold with the extraction amount of an inspection gas component and/or a compound component formed so as to contain the inspection gas component, the gas component and/or the compound component being extracted with an inspection solvent after a magnetic recording medium is allowed to stand in an atmosphere of the inspection gas component. According to the inspection method, there can be determined conditions for the production of a magnetic recording medium, such that generation of deposits onto a magnetic head can be prevented. In addition, the inspection results can be reflected in the production of the magnetic recording medium.

According to the magnetic recording medium of the present invention, the extraction amount of an inspection gas component and/or a compound component formed so as to contain the inspection gas component is equal to or greater than a certain threshold, the gas component and/or the compound component being extracted with an inspection solvent after the magnetic recording medium is allowed to stand in an atmosphere of the inspection gas component. Therefore, since the magnetic recording medium exhibits improved fly stiction characteristic, the medium can be used while the flying height is maintained at a low level, and used at high recording density.

According to the production process of the present invention, the aforementioned magnetic recording medium can be easily produced, since the aforementioned inspection method is carried out.

According to the magnetic recording and reproducing apparatus of the present invention including the aforementioned magnetic recording medium, high recording density can be realized, since fly stiction characteristic is improved and the distance between the medium and a magnetic head can be reduced.

What is claimed is:

1. A method for inspecting deposition characteristics of a deposit on the surface of a protective film predominantly containing carbon of a magnetic recording medium, which medium comprises a disk and the protective film formed on the disk, the disk comprising a non-magnetic substrate, a non-magnetic undercoat layer, and a magnetic layer, the layers being formed on the substrate, characterized in that the method comprises determining that the extraction amount of an inspection gas component and/or a compound component formed so as to contain the inspection gas component is equal to or greater than a predetermined threshold, the gas component and/or the compound component being extracted with an inspection solvent after the magnetic recording medium is allowed to stand in an atmosphere of the inspection gas component.

2. An inspection method according to claim 1, wherein the inspection gas component is a gas generated in a magnetic recording and reproducing apparatus comprising a magnetic recording medium and a magnetic head for recording data onto the medium and reproducing the data therefrom.

3. An inspection method according to claim 1, wherein the inspection gas component is one or more selected from among a siloxane-containing gas, an acrylic-acid-containing gas, vaporized melamine, a vaporized lubricant, a vaporized higher fatty acid, a vaporized phthalic acid ester, and vaporized dioctyl phthalate.

4. An inspection method according to claim 1, wherein the inspection gas component is a gas component generated from a member employed inside the magnetic recording and reproducing apparatus.

5. An inspection method according to claim 1, wherein the inspection solvent is one or more selected from among methanol, ethanol, isopropyl alcohol, and water.

6. An inspection method according to claim 1, wherein the threshold is 0.06 [$\mu$g/100 cm$^2$] when the extracted component is melamine.

7. A process for producing a magnetic recording medium, which process comprises forming a protective film predominantly containing carbon on a disk comprising a non-magnetic substrate, a non-magnetic undercoat layer, and a magnetic layer, the layers being formed on the substrate, characterized in that the protective film is formed such that the extraction amount of an inspection gas component and/or a compound component formed so as to contain the inspection gas component is equal to or greater than a predetermined threshold, the gas component and/or the compound component being extracted with an inspection solvent after the magnetic recording medium is allowed to stand in an atmosphere of the inspection gas component.

8. A production process for a magnetic recording medium according to claim 7, wherein a formation process for the protective film predominantly containing carbon comprises a sputtering process in which the protective film is formed while bias is applied to the disk.

9. A production process for a magnetic recording medium according to claim 7, wherein a formation process for the protective film predominantly containing carbon comprises a plasma CVD process in which a reaction gas containing hydrocarbon is employed as a raw material.

10. A production process for a magnetic recording medium according to claim 7, wherein a formation process for the protective film predominantly containing carbon comprises a formation step including a plasma CVD process in which a reaction gas containing hydrocarbon is employed as a raw material, and a formation step including a sputtering process in which the protective film is formed while bias is applied to the disk.

11. A process for producing a magnetic recording medium containing a non-magnetic substrate, a non-magnetic undercoat layer and a magnetic layer, comprising forming a protective film predominantly containing carbon on at least one of the non-magnetic undercoat layer and the magnetic layer formed on the substrate, allowing the magnetic recording medium to stand in an atmosphere of an inspection gas component including melamine, and extracting at least one of a melamine component and melamine compound component with an inspection solvent after the magnetic recording medium is allowed to stand in said atmosphere, wherein an extract of at least one of melamine component and melamine compound component is at least 0.06 $\mu$g/100 cm$^2$.

12. A process for producing a magnetic recording medium containing a non-magnetic substrate, a non-magnetic undercoat layer and a magnetic layer, the process comprising forming a protective film predominantly containing carbon on at least one of the non-magnetic undercoat layer and the magnetic layer formed on the substrate, allowing the magnetic recording medium to stand in an atmosphere of an inspection gas component, extracting an inspection gas component and/or a compound component formed so as to contain the inspection gas component in an amount equal to a greater than a predetermined threshold with an inspection solvent after the magnetic recording is allowed to stand in said atmosphere, wherein a peak of an infrared spectrum of the surface of the protective film predominantly containing carbon, corresponding to a carbon-hydrogen bond, has an intensity of not more than 0.055.

13. A process for producing a magnetic recording medium containing a non-magnetic substrate, a non-magnetic undercoat layer and a magnetic layer, the process comprising forming a protective film predominantly containing carbon on at least one of a non-magnetic undercoat layer and a magnetic layer formed on a substrate, allowing the magnetic recording medium to stand in an atmosphere of an inspection gas component, extracting an inspection gas component and/or a compound component formed so as to contain the inspection gas component in an amount equal to a greater than a predetermined threshold with an inspection solvent after the magnetic recording is allowed to stand in said atmosphere, wherein the ratio of nitrogen to carbon in the protective film predominantly containing carbon is 5 to 40 at %.

14. A process for producing a magnetic recording medium containing a non-magnetic substrate, a non-magnetic undercoat layer and a magnetic layer, comprising forming a protective film predominantly containing carbon on at least one of a non-magnetic undercoat layer and a magnetic layer formed on a substrate, allowing the magnetic recording medium to stand in an atmosphere of an inspection gas component formed, extracting an inspection gas component and/or a compound component so as to contain the inspection gas component in an amount equal to a greater than a predetermined threshold with an inspection solvent after the magnetic recording is allowed to stand in said atmosphere, wherein Id/Ig of the surface of the protective film predominantly containing carbon is not more than 3.5.

* * * * *